United States Patent
Wei et al.

(10) Patent No.: US 11,989,806 B2
(45) Date of Patent: May 21, 2024

(54) CONTINUOUS CURVE TEXTURES

(71) Applicants: Adobe Inc., San Jose, CA (US); University of Maryland, College Park, College Park, MD (US)

(72) Inventors: Li-Yi Wei, Redwood City, CA (US); Peihan Tu, Greenbelt, MD (US)

(73) Assignees: ADOBE INC., San Jose, CA (US); University of Maryland, College Park, College Park, MD (US)

( * ) Notice: Subject to any disclaimer, the term of this patent is extended or adjusted under 35 U.S.C. 154(b) by 59 days.

(21) Appl. No.: 17/522,795

(22) Filed: Nov. 9, 2021

(65) Prior Publication Data
US 2023/0061244 A1    Mar. 2, 2023

Related U.S. Application Data

(60) Provisional application No. 63/239,788, filed on Sep. 1, 2021.

(51) Int. Cl.
*G06T 11/20* (2006.01)

(52) U.S. Cl.
CPC .......... *G06T 11/206* (2013.01); *G06T 11/203* (2013.01)

(58) Field of Classification Search
CPC ..... G06T 11/206; G06T 11/203; G06T 11/001
See application file for complete search history.

(56) References Cited

U.S. PATENT DOCUMENTS

| | | | | |
|---|---|---|---|---|
| 8,280,703 | B1 * | 10/2012 | Mech | G06T 11/001 |
| | | | | 703/2 |
| 10,269,150 | B1 * | 4/2019 | Stringham | G06T 11/206 |
| 2017/0039722 | A1 * | 2/2017 | Sheffer | G06T 17/30 |
| 2018/0004751 | A1 * | 1/2018 | Vikhe | G06F 16/248 |
| 2019/0164318 | A1 * | 5/2019 | Schiller | G06T 11/203 |
| 2020/0118309 | A1 * | 4/2020 | Biswas | G06T 11/60 |
| 2020/0286219 | A1 * | 9/2020 | Yuan | G06V 10/82 |
| 2020/0311990 | A1 * | 10/2020 | Chen | G06V 30/387 |
| 2021/0082165 | A1 * | 3/2021 | Kumar | G06T 11/203 |
| 2022/0165005 | A1 * | 5/2022 | Johnston | G06F 30/15 |
| 2022/0327400 | A1 * | 10/2022 | Chang | G06N 5/04 |

OTHER PUBLICATIONS

Hsu, C.Y., "Autocomplete Element Fields," CHI 2020, Apr. 2020, 19 pages. (Year: 2020).*
Hsu, C.Y., "Autocomplete Element Fields," CH! 2020, Apr. 2020, 19 pages. (Year: 2020).*
Hsu, C.Y., "Autocomplete Element Fields," CHI 2020, Apr. 2020, 19 pages.

* cited by examiner

*Primary Examiner* — Michael Le
(74) *Attorney, Agent, or Firm* — NICHOLSON DE VOS WEBSTER & ELLIOTT LLP

(57) ABSTRACT

Embodiments are disclosed for generating continuous curve textures based on an input exemplar. A method of generating continuous curve textures may include receiving an input exemplar which represents a repetitive pattern as a plurality of vector curves, generating an input graph representation of the input exemplar which represents a geometry and a topology of the input exemplar, synthesizing an output graph based on the input graph representation, and reconstructing output vector curves from the output graph.

20 Claims, 14 Drawing Sheets

CONTINUOUS CURVE TEXTURES

CROSS-REFERENCE TO RELATED APPLICATIONS

This application claims the benefit of U.S. Provisional Application No. 63/239,788, filed Sep. 1, 2021, which is hereby incorporated by reference.

BACKGROUND

Repetitive patterns are fundamental for a variety of tasks in design and engineering. Manually creating these patterns provides high degrees of individual freedom but can also require significant technical/artistic expertise and manual labor. These usability barriers can be reduced by automatic methods that can synthesize patterns. However, existing techniques mainly focus on discrete patterns including image pixels or shape elements, and might not apply to general patterns that include continuous curves, which can be connected or intersected with one another.

These and other problems exist with regard to generating continuous curve textures in electronic systems.

SUMMARY

Introduced here are techniques/technologies that generate a continuous curve texture from an input exemplar. Repetitive patterns are common in art and design, but typically require substantial manual efforts to draw. The techniques described herein enable a user to draw a small representation of the pattern of interest (e.g., an exemplar) and then generate a continuous curve texture of an arbitrary size that closely resembles the input exemplar. Once the continuous curve texture has been generated, the user can edit and update all or portions of the continuous curve texture, thus saving significant time that would have been required in manually drawing the entire output.

More specifically, in one or more embodiments, an intelligent authoring system receives the input exemplar and generates a graph representation of the input exemplar. The graph representation can capture both the geometry (e.g., specific points of the exemplar) and the topology (e.g., the connections between the sampled points). From the input graph, an output graph can then be synthesized that is similar to the input graph. For example, robust neighborhood matching can be used to ensure that local neighborhoods of the output graph are similar to the input graph. Additionally, assignment techniques may be used to determine attributes for each sample in the output graph, include existence, orientation, edges, etc. Using this information, a heuristics-based reconstruction can then be performed on the output graph to generate the corresponding curves described by the output graph, resulting in an output continuous curve texture.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
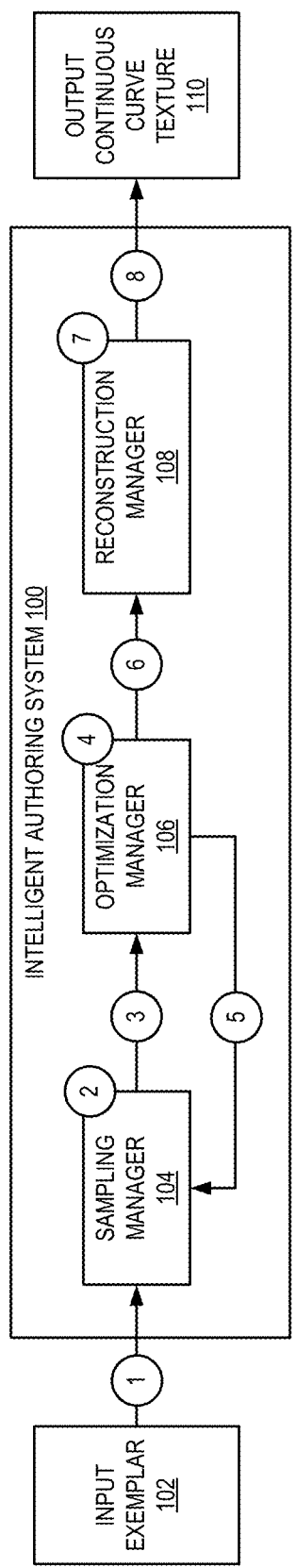
FIG. 1 illustrates a diagram of a process of continuous curve texture generation in accordance with one or more embodiments.

One or more embodiments of the present disclosure include an intelligent authoring system that can generate a continuous curve texture from an input exemplar. In some embodiments, a graph representation of the input exemplar can be generated which captures both the geometry (e.g., by sampling points of the curves) and the topology (e.g., the connections between the sampled points) of the input exemplar. An output continuous curve texture can be synthesized based on the input exemplar. For example, the output may be initialized and then optimized using the graph representation. The output can be iteratively refined using additional graph representations that have been sampled at higher rates, resulting in a higher quality output. This enables a user to draw or otherwise provide a small representative portion of a pattern (e.g., the input exemplar) and then have a similar output automatically synthesized, saving significant time and processing required by manual creation.

As discussed, repetitive patterns are ubiquitous in natural and man-made objects, and can be created with a variety of development tools and methods. Manual authoring provides unprecedented degree of freedom and control, but can require significant artistic expertise and manual labor. Computational methods can automate parts of the manual creation process, but are mainly tailored for discrete pixels or elements instead of more general continuous structures. Embodiments provide an example-based method to synthesize continuous curve patterns from exemplars. This may be performed by extending sample-based discrete element synthesis methods to consider not only sample positions (e.g., geometry) but also their connections (e.g., topology). Since continuous structures can exhibit higher complexity than discrete elements, embodiments also provide robust, hierarchical synthesis to enhance output quality. In some embodiments, the authoring system can generate a variety of continuous curve patterns fully automatically. In some embodiments, for further quality improvement and customization, an autocomplete user interface is provided to facilitate interactive creation and iterative editing of patterns.

Embodiments provide an example-based method that can automatically synthesize continuous curve patterns from user-supplied exemplars. Similar to pixel/sample-based methods, users can provide exemplars and have the algorithm automatically produce results in desired sizes and shapes. However, unlike previous methods and systems that are restricted to discrete pixels/elements or limited continuous structures, embodiments can handle both discrete elements and continuous curves in a variety of patterns.

Unlike past techniques, which relied only on sample positions of the input example, embodiments utilize both sample positions their connections during pattern representation, neighborhood similarity, and synthesis optimization including search and assignment steps. Embodiments use a graph representation for both topology synthesis and geometric path reconstruction for general continuous patterns, in contrast to the graph representations in prior techniques that only apply to discrete elements. Additionally, since continuous patterns can exhibit higher complexity than discrete elements, embodiments perform hierarchical synthesis to enhance output quality.

Automatically generated outputs, although convenient, might not have sufficient quality or fit what users have in mind for their particular applications. To facilitate further editing and customization, an interactive autocomplete authoring interface is provided which enables users to define their patterns and edit the resulting output texture. For example, when the user has defined sufficient exemplars and would like to reduce further manual repetitions, they can specify an output domain to be automatically filled. The synthesized patterns resemble and seamlessly connect with what has already been drawn. If not satisfied, users can accept or modify the predictions, or ask for re-synthesis to maintain full control. They can further designate specific source regions for cloning to target regions.

FIG. 1 illustrates a diagram of a process of continuous curve texture generation in accordance with one or more embodiments. As shown in FIG. 1, an intelligent authoring system 100 may allow for the automatic creation of a continuous curve pattern (e.g., texture) based on an input exemplar 102. The input exemplar 102 may be one or more vector objects (e.g., path objects) that exhibit repetitive patterns. The user may provide the exemplar from a preexisting source, such as a file or other vector graphics source, at numeral 1. Alternatively, the intelligent authoring system may provide a user interface through which the user can manually create the exemplar. The exemplar may be a representation of the overall pattern which the user wants to reproduce. The size of the exemplar required may vary depending on implementation, type of repeating pattern, desired quality of the synthesized output, etc.

Once the exemplar 102 has been received, at numeral 2, a sampling manager 104 of the intelligent authoring system can sample the input exemplar. In some embodiments, the sampling manager 104 may implement hierarchical sampling or other pattern sampling techniques to sample the input exemplar. The sampling may capture point samples, connections between samples, and orientations of the path objects of the input exemplar 102. This may result in a graph which represents this information. At numeral 3, the graph may be provided to optimization manager 106. At numerals 4 and 5, the optimization manager 106 may iteratively process higher resolution sample data of the input exemplar and optimize the graph using various matching techniques (such as neighborhood matching). With each iteration, the sampling manager 104 may be instructed to perform a higher resolution sampling of the input exemplar. This sample data may be added to, or used in place of, the earlier sample data by the optimization manager 106. Iterations may continue until the pattern converges. This results in a synthesized output graph that is similar to the input exemplar 102.

The synthesized output graph may be provided to reconstruction manager 108 at numeral 6. At numeral 7, the reconstruction manager 108 takes the synthesized output graph as input to generates output patterns that may include discrete elements and continuous structures. For discrete elements, each sample is uniquely associated with an element. The reconstruction is to transform the element shapes by treating samples as control points. Specifically, similarity transform may be assumed to reconstruct the elements. For the continuous structures, paths are reconstructed from the graph samples and edges, where the samples are used as control points of Bezier curves. Samples with only one neighbor are unambiguous and thus only included within one path. Samples with only two neighbors could be included in one path as path samples, or two paths as junction samples. Samples with more than two neighbors are junction samples that are included in multiple potential paths.

To reconstruct a pattern without ambiguity, the following steps may be performed. First, the reconstruction manager 108 identifies pairs of local path orientations o(s) (if any) that are opposite. Second, the reconstruction manager 108 matches local orientations o(s) with edges e∈ε(s) connected to the sample using the Hungarian algorithm by minimizing the sum of absolute difference between local orientation and edge angles. Third, the reconstruction manager 108 generates a path by including edges that are connected together and matched with opposite orientations.

The resulting reconstructed vector pattern is then output at numeral 8 as output continuous curve texture 110. This may be displayed to the user via a user interface of the intelligent authoring system or via another application, system, etc.

Figure 2:
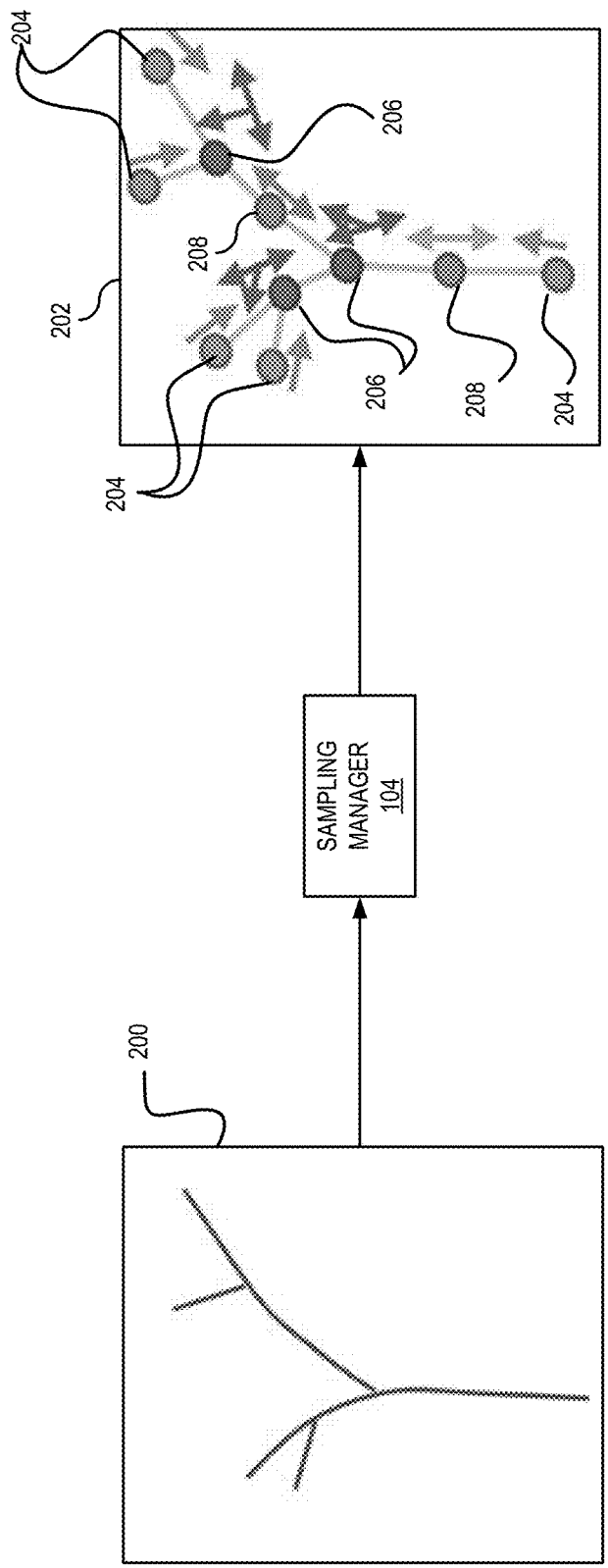
FIG. 2 illustrates an example of sampling an input curve in accordance with one or more embodiments.

FIG. 2 illustrates an example of sampling an input curve in accordance with one or more embodiments. As discussed, patterns and elements may be represented via point samples and graphs. For example, as shown in FIG. 2, an input exemplar 200 can be received by the intelligent authoring system. In some embodiments, the input exemplar 200 may be drawn or otherwise defined by the user through a user interface of the intelligent authoring system. Additionally, or alternatively, the user may draw the exemplar in a different application, such as a vector graphics application, and provide the exemplar to the intelligent authoring system. For example, the user may open, or link to, a file that includes the input exemplar. As shown, the input exemplar 200 may include a plurality of curves. The input exemplar 200 may first be processed by sampling manager 104 which can sample the curves of the input exemplar to generate a sampled representation 202. In various embodiments, the sampled representation 202 may be a graph-based representation that captures both the topology (e.g., connections between samples) and the geometry (e.g., the sample positions) of all or portions of the input exemplar.

In some embodiments, the sampled input includes a plurality of samples and edges. Each sample s records its position p(s), attributes a(s), and i(s) ∈[0, 1] to indicate the confidence of its existence to optimize the number of samples, as shown in equation 1:

$$u(s)=(p(s),a(s),i(s)) \tag{1}$$

As noted, i(s) ranges between 0 and 1, indicating the probability of the existence of a sample. In some embodiments, the optimal number of samples can be determined by summing i(s) for all samples.

For discrete elements, sample attributes include a sample ID q(s) that indicates the uniqueness of s to other samples within its containing element. In discrete element synthesis, it is sufficient to use only samples with ID q(s) to encode element shape because every element has the same topology. On the other hand, continuous structures are comprised of paths and have more flexibilities. Paths may be represented by linear and quadratic Bézier curves, or other vector curve formats. The paths may be connected to each other with complex topologies. Thus, samples alone are not sufficient to disambiguate matching and reconstruction of continuous structures. Therefore, embodiments also consider connectivity among samples, leading to a graph-based representation, such as sampled representation 202.

Specifically, embodiments record the connectivity ε(s) for s within a(s). $\varepsilon(s)=\{e_{ss'}\}$ is the set of edges associated with s, where ess' represents the edge between the two samples s and s'. The confidence of an edge's existence is represented using $i(e) \in [0\ 1]$. Additionally, $i(e_{ss'})=1/0$ indicates the presence/absence of an edge between s and s'. In some embodiments, the binary $i(e_{ss'})$ is relaxed to be within the range [0 1] during optimization-based synthesis. While ε(s) records pattern topology, embodiments also record the tangent angles at s on a path via an orientation attribute $o \in \mathcal{R}^{N_o}$ as part of a(s), where $N_o$ is the number of entries in o(s). Each entry o of o is within [0, 2π). In some embodiments, o is recorded to facilitate pattern reconstruction from graphs, as further discussed below. Note that, for any input samples $s_i$, $|\varepsilon(s_i)|=N_o(s_i)$, where |ε| is the size of the edge set ε. However, this constraint may be relaxed for the output during the synthesis to facilitate faster convergence.

In some embodiments, each sample s records its attributes a(s) that may vary in terms of types of patterns (e.g., discrete element or continuous structure). Where q(s)≥0, this indicates uniqueness of a sample relative to other samples within a discrete element. When q(s)=−1, then sample s is associated with a continuous structure. Additionally, $\varepsilon(s)=\{e_{ss'}\}$ records all edges associated with s, where $e_{ss'}$ is an edge between s and s'. The orientation associated with each sample may be represented as o(s), which records the local orientations of the paths intersecting at sample s.

In some embodiments, a multi-resolution representation of sample graphs may be used to handle patterns with complex structures. The representation is sparser with fewer samples at coarser resolutions and becomes denser with more samples at finer resolutions. By default, three level of hierarchies may be used, however in various embodiments more or fewer levels of hierarchies may be used depending on specific application needs (e.g., accuracy, processing time, etc.).

Discrete element samples can be generated using a simple approach. For example, the finest level of samples are generated by sampling the element polygon. The coarsest level may include one sample centered at each element. The middle level of samples are located at the midpoints of each downsampled finest-level samples and the coarsest-level element centers.

For continuous patterns, however, sampling may be more complex. For example, as shown at 202, the sampling may include the endpoints 204 of the paths in the input exemplar and the intersections 206 of the paths. Additional samples may be taken uniformly along the paths with spacing δ. This results in samples 208. The value or values selected for parameter δ may vary depending on application or may be tuned by the user, the authoring system, or other system or entity, to improve performance and/or accuracy of the results. For example, increasing the number of samples may lower the performance of method but may improve synthesis quality. As discussed, the resulting sampled representation 202 includes a plurality of samples and edges connecting the samples. Each sample is associated with attributes (e.g., connected edge(s), orientation(s), likelihood of existence, etc.). The sampled representation may then be used to generate and optimize a continuous curve texture.

Figure 3:
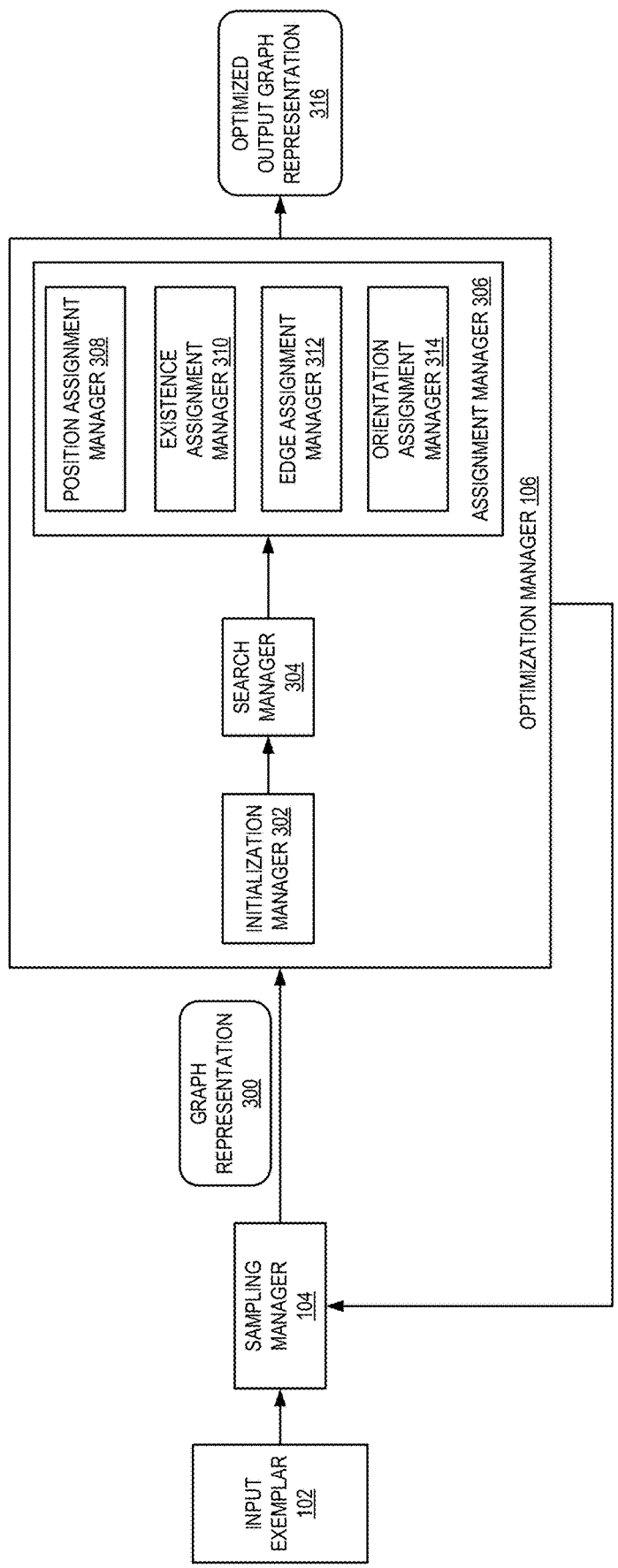
FIG. 3 illustrates an example of optimizing a synthesized curve texture in accordance with one or more embodiments.

FIG. 3 illustrates an example of optimizing a synthesized curve texture in accordance with one or more embodiments. In some embodiments, once the input exemplar has been represented as a graph (e.g., the sampled representation discussed above), this input graph can be used to synthesize a similar output graph. In various embodiments, the output graph can be larger or smaller than the input graph. Additionally, the output graph can be in a different shape than the input graph. For example, the input exemplar may be drawn to fill a roughly rectangular shape and the output graph can be constructed to fill a roughly circular shape. Pattern synthesis relies on measuring the similarity between local regions of the patterns. As discussed, the input graph is provided by sampling manager 104 to optimization manager 106, which can initialize an output graph and then ensure similarity with the input graph. The optimization process may be performed multiple times, with more densely sampled input graphs, to improve the quality of the output graph. Similarity may be analyzed by comparing local neighborhoods between the input graph and the output graph. If all local neighborhoods are found to be similar, then the input and output graphs can be considered similar.

The difference between two samples s and s', which includes the differences in the global position p and attributes a, is defined as follows in equations 2 and 3, respectively:

$$\hat{p}(s,s')=p(s)-p(s') \tag{2}$$

$$\hat{a}(s,s')=(\hat{q}(s,s'),\hat{\varepsilon}(s,s')) \tag{3}$$

The differences in sample ID attribute q is shown in equation 4:

$$\hat{q}(s,s')=\mathbb{1}\,\{q(s)\neq q(s')\} \tag{4}$$

where $\mathbb{1}$ is an indicator function that equals to one if its condition holds, and zero otherwise. The edge set difference is defined below in equation 5:

$$\hat{\varepsilon}(s,s') = \left( \sum_{e_{s\hat{s}} \in \varepsilon(s)} dist(e_{s\hat{s}}, e_{s'\hat{s}'}) \right) + \beta \||\varepsilon(s)| - |\varepsilon(s')|\| \tag{5}$$

where $dist(e_{s\hat{s}}, e_{s'\hat{s}'})=\|\hat{p}(s,\hat{s})-\hat{p}(s',\hat{s}')\|$ is the difference between $e_{s\hat{s}}$ and $e_{s'\hat{s}'}=m_e(e_{s\hat{s}}) \in \varepsilon(s')$ is the matching edge for $e_{s\hat{s}\hat{s}}$ via the Hungarian algorithm (which solves the one-to-one matching relationship between edges) to minimize the first term in Equation 5 (m indicates matching relationship). β is a weighting parameter set to sampling distance δ. Newly added output samples that do not have any edges, either by initialization or existence assignment, as discussed further below, may still be useful and connected to existing output samples. To this end, they should be encouraged (via lower cost) to match with input samples during the search step, discussed further below. In some embodiments, β=0 for these samples and thus Equation (5) becomes 0, as the first term is also 0 since newly created samples do not have edges.

The attribute similarity term (Equation (3)) does not need to include the orientation information o, since the edge information ε already includes similar information. However, the orientation information is updated during synthesis and reconstruction. This requires matching orientation entries o within o from s and s' respectively. The matching o(s')=m$_o$(o(s))∈(s') may also be computed via the Hungarian algorithm by minimizing the sum of smallest absolute differences between matched o(s) and o(s'), for example:

$$\hat{o}(s,s') = \Sigma_{o(s) \in o(s)} \hat{o}(s,s') \quad (6)$$

where ô(s,s')=min(|o(s)−m$_o$(o(s))|,2π−|o(s)−m$_o$(o(s))|)
Additionally, it was not necessary to include i in the sample similarity measure in Equation (3). Instead, i is used to optimize the number of samples.

As discussed, neighborhood similarity may be used to identify when two graphs are similar. For example, two local neighborhoods (e.g., two sub graphs) can be compared by measuring their similarities using graph similarity techniques. Since the graphs includes both nodes and edges, the similarity measure is the difference between the nodes of the graphs (e.g., the sampled points) plus the differences between edges. Neighborhood similarity is then the sum of every pair of points and the difference of the number of points in the two sub graphs The neighborhood of s, n(s), may be defined as a set of samples around s's spatial vicinity within a certain radius r. The neighborhood similarity is defined as $$\|n(s_o) - n(s_i)\| = \sum_{s'_o \in m_n(n(s_i))} \hat{u}_{s_o s_i}(s'_o, s'_i) + \sum_{s'_o \in n(s_o) \ominus m_n} c(s'_o) \quad (7)$$

where $$\hat{u}_{s_o s_i} = \|\hat{p}(s'_o, s'_o) - \hat{p}(s'_i, s'_i)\| + \gamma \|\hat{a}(s'_o, s'i)\| \quad (8)$$

is the sample similarity between s'$_o$ and s'$_i$ within neighborhoods centered at s$_o$ and s$_i$ respectively. s'$_i$=m$_s$(s'$_o$) is the matching input sample for s'$_o$. The positional differences |p̂(s'$_o$, s'$_o$)−p̂(s'$_i$,s'$_i$)| are computed in local neighborhood coordinate systems centered at s$_o$ or s$_i$. The two terms in Equation (7) partition n(s$_o$) into two sets. In the first term of Equation (7), m$_n$ (n(s$_i$)) is the subset of n(s$_o$) matched with samples within n(s$_i$). The second term of Equation (7), c(s'$_o$) is the cost resulting from unmatched output samples s'$_o$. In some embodiments, γ=0.5, though this value may be tuned depending on performance, quality, etc.

In some prior techniques, each output sample is forced to match with another sample in the input, which could be problematic since some output samples are outliers and should not be matched to any input samples. Additionally, some output samples might be missing in the current iteration of optimization. This may be referred to as hard neighborhood matching. In other prior techniques, the neighborhoods are matched via comparing their density fields estimated with Gaussian kernels. This similarity criterion is computed with the neighborhoods as a whole. There is no one-to-one correspondence between samples. This may be referred to as soft neighborhood matching. These techniques encode attributes as the height of the density kernel, which could unnecessarily couple the position and attribute information. It is not easy to integrate soft matching with various sample attributes, which can include edges.

Instead, embodiments use a robust neighborhood matching that explicitly considers outliers in the output to address these issues with prior techniques. To synthesize an accurate-looking continuous curve texture, synthesis quality has to be high. As such, a high quality point synthesis method is needed. Robust neighborhood matching provides such a method that improved the output results. An output sample is either matched with an input sample or unmatched as an outlier with additional cost c. The Hungarian algorithm can be applied to compute the matchings between input n(s$_i$) and output neighborhoods n(s$_o$). The input of the Hungarian algorithm is a cost matrix where each entry indicates the matching cost between an output and an input sample. The cost matrix C∈R N$_{no}$×(N$_{ni}$+N$_{no}$) as:

$$C = [C_m \mid C_u] \quad (9)$$

$$C_m = \begin{bmatrix} \hat{u}_{s_o s_i}(s'^1_o, s'^1_i) & \hat{u}_{s_o s_i}(s'^1_o, s'^2_i) & \cdots & \hat{u}_{s_o s_i}(s'^1_o, s'^{N_{ni}}_i) \\ \hat{u}_{s_o s_i}(s'^2_o, s'^1_i) & \hat{u}_{s_o s_i}(s'^2_o, s'^2_i) & \cdots & \hat{u}_{s_o s_i}(s'^2_o, s'^{N_{ni}}_i) \\ \vdots & \vdots & \ddots & \vdots \\ \hat{u}_{s_o s_i}(s'^{N_{no}}_o, s'^1_i) & \hat{u}_{s_o s_i}(s'^{N_{no}}_o, s'^2_i) & \cdots & \hat{u}_{s_o s_i}(s'^{N_{no}}_o, s'^{N_{ni}}_i) \end{bmatrix} \quad (10)$$

$$C_u \begin{pmatrix} c_1 & c_1 & \cdots & c_1 \\ c_2 & c_2 & \cdots & c_2 \\ \vdots & \vdots & \vdots & \vdots \\ c_{N_{no}} & c_{N_{no}} & \cdots & c_{N_{no}} \end{pmatrix} \quad (11)$$

where the superscripts of s'$_o$ or s'$_i$ represent the index of a sample within n(s$_o$) or n(s$_i$). There are N$_{ni}$ and N$_{no}$ samples within n(s$_i$) and n(s$_o$), respectively. In prior techniques, the sample matching is computed via only the C$_m$ part of C, in which case every output sample should be matched. The cost matrix used in various embodiments, unlike prior techniques, is augmented with the C$_u$ side, where each entry represents the cost of unmatched outliers in n(s$_o$). The system ensures that there are enough samples in the input neighborhood so that an output sample would not be matched only when it is an outlier that would result in a high cost increase in matching. For the same reason, missing output samples are not taken into account in the cost matrix formulation.

In some embodiments, c$_k$ is set as min(2,1.2+0.4|ε(s$_o^k$)|)δ if the output sample s$_o^k$ is from a continuous pattern, and 1.5× average nearest neighbor distance if s$_o^k$ is from a discrete element. In an interactive system, predictions may be synthesized near the provided exemplars. If s$_o^k$ is from the exemplars, c$_k$=∞ because none of the samples from the exemplars are outliers and all of them should be matched.

In a neighborhood, there might be samples from both discrete elements and continuous structures. Embodiments only match samples from the same type of patterns and with the same ID, e.g., continuous structures only match with continuous structures (negative ID), and discrete elements only match the same discrete elements and their samples with the same (non-negative) IDs.

Based on the graph representation 300 and similarity measures described above, the optimization manager 106 can then synthesize an output similar to a given input. The optimization manager 106 synthesizes output predictions $\mathcal{O}$ via optimizing the following objective:

$$E(O) = \sum_{s_i = m(s_o), s_o \in O} \| n(s_o) - n(s_i) \| + \Theta(O, \mathcal{D}) \tag{12}$$

where $s_o$ is matched with $s_i$. This energy sums up the similarity between every $n(s_o)$ in $\mathcal{O}$ and its most similar $n(s_i)$ via Equation (7). $\Theta(\mathcal{O}, \mathcal{D}, )$ is the domain constraint term to encourage the synthesized samples to stay within the user-specified domain $\mathcal{D}$, The pattern optimization framework adopts an EM-like strategy to minimize Equation (12), by iterating the search and assignment steps as detailed below.

In some embodiments, initialization manager 302 copies new patches one-by-one with similar boundary patterns to existing patches for initialization. Each next patch is selected to ensure high similarity (as evaluated by Equation (7)) in the overlapped boundary regions with existing patches. In the overlapping regions, the initialization may only copy samples unmatched with any sample in the existing patches. The initialized samples are kept within the output domain $\mathcal{D}$, by removing samples outside it. Although patch-based initialization allows for faster convergence, leading to a more responsive user interface experience, in some embodiments the initialization manager 302 may initialize a random output graph.

Once the output graph has been initialized (e.g., either randomly or using a patch-based approach), search manager 304 can then compute approximate nearest neighbors (ANN) for each output sample in the output graph. In some embodiments, the search manager 304 may implement a PatchMatch algorithm which 1) randomly generates the initial nearest neighbor field, and 2) alternates between propagation and search steps by traversing the regular image grid in a scanline order. Initially, the ANN is generated by randomly assigning an output sample to an input sample (with identical sample ID for discrete elements). One issue is how to choose a sample traversal order. In some embodiments, a simple graph is built by connecting each sample with its k-nearest neighbors (k=8 in one implementation, though larger or smaller values of k may be used), and a breadth-first search is performed. In the next iteration, the traversal starts from the last sample in the most recent sequence.

In some embodiments, for the random search step, the maximum window size is 150, and the minimum size is 25, and the search window is exponentially decreased with factor 2. In each pattern optimization step, the search manager 304 computes an ANN. In two consecutive steps, the output sample distributions are similar. So, the previous ANN is used to initialize the subsequent PatchMatch algorithm. Since the initialization is close to the converged ANN, a small number of PatchMatch iterations is used, except for the initial step at each level of hierarchical synthesis, which may use more iterations. In some embodiments, the PatchMatch implementation is parallelized by equally dividing the output domain into regions, the number of which equals to that of the number of available threads. The search step consumes most of the computation time needed by the synthesis. The computational complexity of the search step in an optimization step is $\mathcal{O}(n\mathcal{O}N_n^3)$, where $n\mathcal{O}$ is the total number of output samples and $N_n$ is the average number of samples within neighborhoods.

Once the output graph has been updated by the search manager 304, the updated output graph can be processed by assignment manager 306. The assignment manager can determine the values associated with the sample positions and their attributes. For example, assignment manager 306 can determine the values of sample positions p, attributes including edge $\varepsilon$ and orientation o, as well as sample existence i. The assignments of these different quantities can be determined by taking votes from overlapping output neighborhoods at the same entity (such as sample or edge). In particular, discrete samples only have sample ID attributes q, which is used in the search step to make sure only samples with the same q are matched. Thus, only position assignment is deployed for discrete samples.

Position assignment manager 308 can perform position assignment on the samples in the output graph. For each output sample $s_o$ and its neighbor $s'_o$, there is a set of matched input sample pairs $s_i$, $s'_i$ provided by the previous search step. The estimated distance $\hat{p}(s_o, s'_o)$ between $s_o$ and $s'_o$ is $$\hat{p}(s_o, s'_o) \approx p(s_i) - p(s'_i) \tag{13}$$

In some embodiments, least squares can be used to estimate $p(s_o)$ by $$\arg\min_{\{p(s_o)\}} \sum_{s_o \in O} \sum_{s'_o \in O} \| \hat{p}(s_o, s'_o) - (p(s_i) - p(s'_i)) \|^2 + \sum_{s_o \notin \mathcal{D}} \| \hat{p}(s_o, \mathcal{D}) \|^2 \tag{14}$$

The second term in Equation (14) is the domain constraint to encourage output samples to stay within $\mathcal{D}$, where $\hat{p}(s_o, \mathcal{D}, )$ is the shortest vector from $s_o$ to the boundary of $\mathcal{D}$, and $s_o \notin \mathcal{D}$, indicates $s_o$ is outside $\mathcal{D}$, .

Existence assignment manager 310 can then determine the likelihood of existence for each sample. This allows for the number of samples within local regions to be adjusted during the synthesis process for better quality. The number of samples is optimized via existence i assignment, again via a voting scheme:

$$\arg\min_{i(s_o) \in [0\ 1]_{s_i \in \{s_i\}}} \sum |i(s_o) - i(s_i)|^2 \tag{15}$$

where $s_i$ runs through the set $\{s_i\}$ that is collected during neighborhood matching, i.e. the corresponding input samples of an output sample from overlapping input neighborhoods. $i(s_i)=0$ if $s_o$ is not matched with any $s_i$ in a pair of matched input and output neighborhoods, and $i(s_i)=1$ otherwise. Equation (15) computes the confidence of existence $i(s_o) \in [0\ 1]$ of an output sample $s_o$. Every iteration, output samples $s_o$ are removed whose $i(s_o)<$a threshold value (e.g., 0.5 or other value). If no samples have a $i(s_o)<$a threshold value then no samples may be removed on that iteration. The above assignment step is applied to samples that are already in the output sample distribution. To add back missing output samples, the existence assignment manager 310 first generates candidate samples, merges them as output samples, and picks those with $i(s_o)>$a threshold value as added output samples. If no samples have a $i(s_o)>$a threshold value, then none of the newly generated samples are added to the output samples. In some embodiments, this threshold value may be the same as the threshold for removal described above. Alternatively, different threshold values may be used for removal of samples and for addition of samples. The energy in Equation (15) is not guaranteed to decrease immediately after sample addition or removal, but it will generally decrease through iterations.

Listing 1 shows one example of an algorithm for generating additional samples during existence assignment which may be implemented by existence assignment manager 310.

---

Listing 1

---

```
 1: function GenerateNewOutputSamples({n(s_i), n(s_o)})
 2:   {s_o^c} ← ∅ {candidate sample set}
 3:   {𝒮} ← ∅ {𝒮 is a cluster that contains some candidate samples}
 4:   {s_o} ← ∅ {new output sample set}
 5:   for n(s_i), n(s_o) ∈ {n((s_i), n(s_o)} do
 6:     for s'_i ∈ n(s_i) do
 7:       if s'_i is unmatched then
 8:         Generate a candidate sample s_o^c with p(s_o^c) = p(s'_i) −
            p(s_i) + p(s_o) and other attributes are the same to s'_i
 9:         {s_o^c} ← {s_o^c} ∪ s_o^c
10:       end if
11:     end for
12:   end for
13:   for s_o^c ∈ {s_o^c} do
14:     {Generate clusters from the candidate sample set by greedily
         looping over all candidates; more advanced clustering
         technique can be applied to replace this step}
15:     Find the 𝒮 within {𝒮} with nearest center to s_o^c
16:     if Distance(𝒮, s_o^c) < 0.5δ then
17:       {Distance(𝒮, s_o^c) computes the spatial distance between
           the center of 𝒮 and s_o^c}
18:       𝒮 ← 𝒮 ∪ s_o^c
19:     else
20:       𝒮' ← ∅
21:       𝒮' ← 𝒮' ∪ s_o^c
22:       {𝒮} ← {𝒮} ∪ 𝒮'
23:     end if
24:   end for
25:   for 𝒮 ∈ {𝒮} do
26:     create a new s_o with averaged sample positions and attributes
         by merging all {s_o} within 𝒮

27:     i(s_o) ← (# 𝒮) / (# overlapping n over s_o)  {existence assignment}

28:     if i(s_o) > 0.5 then
29:       {s_o} ← s_o
30:     end if
31:   end for
32:   return {s_o}
```

---

The candidate samples are generated from pairs of $n(s_i)$ and $n(s_o)$ (lines 5-12 in Listing 1). In a pair of $n(s_i)$ and $n(s_o)$, if there is an unmatched input sample s'i in $n(s_i)$ (line 7), it indicates the potential lack of an output sample, whose global position is $p(s_o^c)=p(s'_i)-p(s_i)+p(s_o)$ located within $n(s_o)$, and attributes are the same to $s'_i$ (line 8). The Listing loops over all pairs of neighborhoods, each neighborhood pair may or may not produce new candidate samples. All these samples $s_o^c$ form a candidate sample set $\{s_o^c\}$. The candidate sample set $\{s_o^c\}$ is grouped into clusters $\{\mathcal{S}\}$ (line 13-24) by assigning a sample to its nearest cluster S with distance between $s_o^c$ and the center of $\mathcal{S}$ smaller than $0.5\delta$ or otherwise create a new cluster $\mathcal{S}'$ using the sample. For each cluster $\mathcal{S} \in \{\mathcal{S}\}$ (line 25-31), all of its candidate samples $\{s_o^c\} \in \mathcal{S}$ are merged as one output sample $s_o$ by averaging their position and attributes using the same way as in the assignment step. The existence of $s_o$ is assigned as the ratio of the number of candidates within $\mathcal{S}$ over the number of overlapping n over the position of $s_o$. For the sake of explanation, assume $i(s_o)=1$, it means all n overlapping over $s_o$ produce one candidate sample on average, which suggests there could be missing samples, around $s_o$. Finally, $s_o$ with $i>0.5$ is added into the output sample distribution every iteration.

Edge assignment manager 312 can then determine the likelihood of existence for the edges of the output graph. In some embodiments, edges are assigned by optimizing the following objective $$\underset{\{i(e_{s_o s'_o})\in\{0,1\}\}\{e_{s_o s'_o}\}}{\arg\min} \sum_{\{e_{s_o s'_o}\}} |i(e_{s_o s'_o}) - \bar{i}(e_{s_o s'_o})| + \sum_{\{s_o\}} \||\mathcal{E}(s_o)| - |\bar{\mathcal{E}}(s_o)|\| \quad (16)$$

where the first term computes the difference between the actual and expected edge confidences $\bar{i}(e_{s_o s'_o}) \in [0\ 1]$. i is the vote by overlapping input neighborhoods on the same edge, computed using least squares by replacing samples in Equation (15) with edges. $\{e_{s_o s'_o}\}$ is the set of edges that have $i(e_{s_o s'_o})>0$, and there is no edge between $s_o$ and $s'_o$ if $i(e_{s_o s'_o})=0$. The second term computes the differences between the optimized number of edges $|\mathcal{E}(s_o)|$ and the expected number of edges $|\bar{\mathcal{E}}(s_o)|$ connected to $s_o$. $|\bar{\mathcal{E}}(s_o)|$ is similarly computed by voting from overlapping output neighborhoods on the same sample $s_o$:

$$\underset{|\mathcal{E}(s_o)|}{\arg\min} \sum_{s_i\in\{s_i\}} \||\bar{\mathcal{E}}(s_o)| - |\bar{\mathcal{E}}(s_i)|\|^2 \quad (17)$$

Basically, the average of $\{|\mathcal{E}(s_i)|\}$ is computed. In sum, the first term is edge-centric while the second is sample-centric.

It is non-trivial to optimize Equation (16), where the optimization variables $\{i(e_{s_o s'_o})\}$ are binary. Thus, it is solved in a greedy fashion. First, all $i(e_{s_o s'_o})$ are initialized to 0. Output edges $\{e_{s_o s'_o}\}$ are then sorted by their expected confidence of existence $\bar{i}(e_{s_o s'_o})$, and $i(e_{s_o s'_o})$ is optimized greedily by looping over the sorted $\{e_{s_o s'_o}\}$ in decreasing confidence. For each $e_{s_o s'_o}$, it is decided whether $i(e_{s_o s'_o})=0$ or 1 by choosing the one that minimizes Equation (16). In other words, the multivariate optimization problem (Equation (16)) is optimized by solving univariate optimization problems in a loop. By decomposing the optimization variables in Equation (16) from a set of edges $\{e_{s_o s'_o}\}$ to a single edge $i(e_{s_o s'_o})$ to be optimized and the rest, the univariate version of Equation (16) can be written as:

$$\underset{i(e_{s^*_o s^{*\prime}_o})}{\arg\min} E'_e + E''_e \quad (18)$$

where $$E'_e(i(e_{s^*_o s^{*\prime}_o})) = \quad (19)$$

$$|i(e_{s^*_o s^{*\prime}_o}) - \bar{i}(e_{s^*_o s^{*\prime}_o})| + \||\mathcal{E}(s^*_o)| - |\bar{\mathcal{E}}(s^*_o)|\| + \||\mathcal{E}(s^{*\prime}_o)| - |\bar{\mathcal{E}}(s^{*\prime}_o)|\|,$$

$$E''_e(i(e_{s^*_o s^{*\prime}_o})) = \quad (20)$$

$$\sum_{\{e_{s_o s'_o}\}\ominus e_{s^*_o s^{*\prime}_o}} |i(e_{s_o s'_o}) - \bar{i}(e_{s_o s'_o})| + \sum_{\{s_o\}\ominus\{s^*_o, s^{*\prime}_o\}} \||\mathcal{E}(s_o)| - |\bar{\mathcal{E}}(s_o)|\|.$$

Since $E_e''$ is a constant in equation 18, it is equivalent to:

$$\underset{i(e_{s^*_o s^{*\prime}_o})\in\{0,1\}}{\arg\min}\ E'_e \quad (21)$$

Equation (21) can be solved with brute-force search. The search space is 2 ({0, 1}).

Orientation assignment manager 314 can determine the orientation values associated with each sample. As discussed above with respect to the search manager 304, each $o(s_o)$ is matched with a set of $\{o(s_i)\}$ associated with input samples coming from different input neighborhoods, and each entry $o(s_o) \in o(s_o)$ has been matched with a $o(s_i) \in o(s_i)$. The local orientation attribute $o(s_o)$ is updated by a voting scheme among $\{o(s_i)\}$, where $\{o(s_i)\}$ could have different lengths across different $s_i$.

The orientation assignment manager 314 optimizes both dimension $N_o$ and value of entries $o$ in order. In the input exemplar, the number of orientation entries $N_o(s_i)$ equals $|\varepsilon(s_i)|$. Thus, $N_o$ can be computed like in Equation (17) and rounding the result as integers. Essentially, the orientation assignment manager 314 attempts to find an integer $N_o(s_o)$ that is the closest to the arithmetic average of $\{N_o(s_i)\}$.

Similarly, orientation assignment manager 314 can update the values $o(s_o)$ in $o(s_o)$ using the same voting scheme to Equations (15) and (17). A special case is when $N_o(s_o)$ is updated to a new value (changing $o(s_o)$ vector length). In this case, orientation assignment manager 314 adds or removes one or several entries to or from the original $o(s_o)$. To remove an entry from $o(s_o)$, orientation assignment manager 314 picks the one whose matched set of input votes $\{o(s_i)\}$ has the largest variance. To add an entry to $o(s_o)$, orientation assignment manager 314 collects orientation entries $\{o'(s_i)\}$ from the input samples that remain unmatched to any orientation entries $o(s_o)$ of the matched output sample, and adds a new entry $o(s_o)$ into $o(s_o)$ as the median from the unmatched set $\{o'(s_i)\}$. In the rare case where we need to add more than one entry to $o(s_o)$, orientation assignment manager 314 randomly chooses from $\{o'(s_i)\}$ after the median is used for the first add-on.

In some embodiments, instead of using a single-resolution representation, a hierarchical representation is applied for multi-resolution synthesis. The system first synthesizes the predictions at a coarse level using sparse representation, and then reconstructs the patterns based on sparse samples. This process continues with a denser and denser pattern representation. For example, processing returns to sampling manager 104 with an instruction to generate a denser pattern than was processed previously. For continuous structures, the sampling distance δ of continuous pattern is gradually increasing with respect to the level of hierarchy. During synthesis, multi-scale neighborhood sizes are used to keep both large and local structures. The neighborhood size is gradually reduced at different hierarchies. For example, in some embodiments, at each hierarchy, there are 7 search-assignment iterations. This looping may be performed a set number of times (e.g., three times for a three-level hierarchy, or other number depending on hierarchy structure), or until a set quality threshold is reached. Once the optimized output graph representation 316 has been generated, it can be provided to reconstruction manager to synthesize the output texture.

Figure 4:
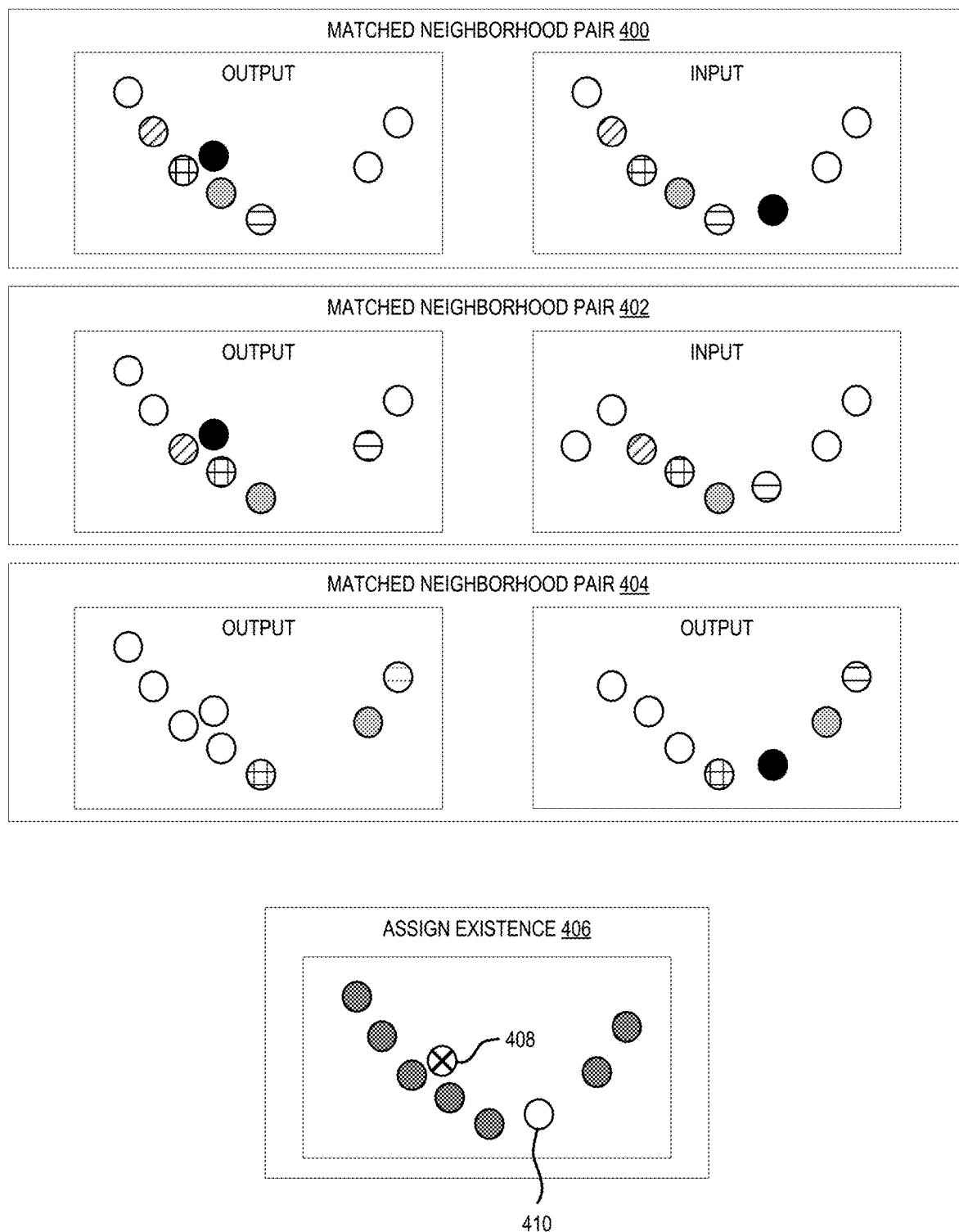
FIG. 4 illustrates examples of existence assignment in accordance with one or more embodiments.

FIG. 4 illustrates examples of existence assignment in accordance with one or more embodiments. The example of FIG. 4 visualizes how to compute confidences of existence of output samples $i(s_o)$ from a set of matched input and output neighborhoods. Three pairs of matched input and output neighborhoods 400, 402, and 404 are shown, centered at different samples (shown in light grey) over the same set of samples. Matched samples are in the same pattern. Solid white circles indicate samples outside a neighborhood. Solid black circles indicate samples within a neighborhood but unmatched.

This resulting existence assignment is shown at 406. In this example, the black cross sample 408 has $i(s_o)=0$, since it is unmatched with any $s_i(i(s_i)=0)$ in neighborhoods 400 or 402. The white sample 410 in 406 has confidence $i(s_o)=2/3$: in the three pairs of neighborhoods, there are two pairs of neighborhoods 400 and 404 where each has an unmatched input sample, which indicates there could be a missing sample in the output located at approximately the same location relative to its neighborhood center; the two unmatched input samples are merged to generate the new output sample 410.

Figure 5:
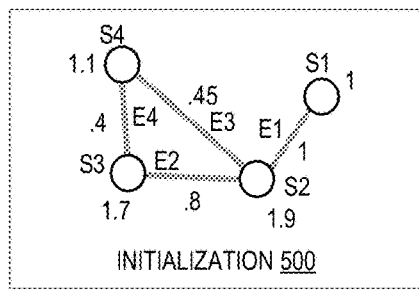
FIG. 5 illustrates examples of edge assignment in accordance with one or more embodiments.
Figure 5:
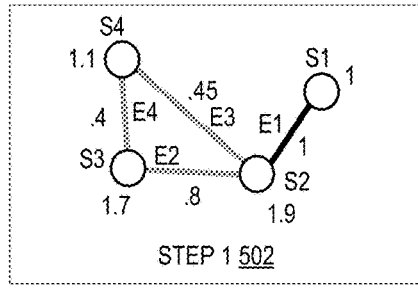
Figure 5:
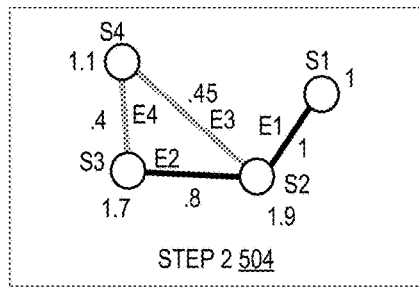
Figure 5:
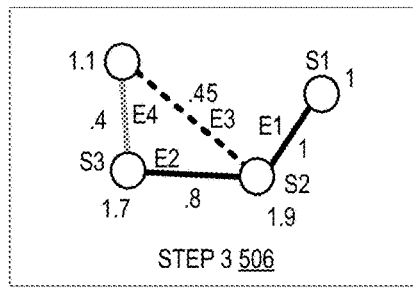
Figure 5:
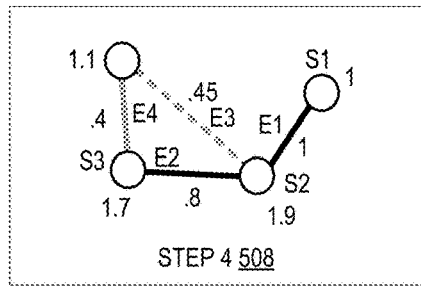

FIG. 5 illustrates examples of edge assignment in accordance with one or more embodiments. This example illustrates an application of Equation (16), described above, for edge assignment by solving Equation (21) in a loop. Each step 1 502 to 4 508 solves Equation (21) once. There are four samples (s1-s4) and four potential edges (e1-e4) (with $\bar{\iota}(e)>0$). The numbers near edges or samples indicate the expected confidence of existence $i(e)$ of the edges or the expected number of edges $|\varepsilon(s)|$ associated with samples (e.g. $\bar{\iota}(e_2)=0.8$, $|\varepsilon(s_2)|=1.9$, etc.). During initialization 500, the optimization manager initializes all $i(e)=0$ and sorts all potential edges by its $\bar{\iota}$ the largest to the smallest: e1 is the one with the largest $\bar{\iota}$ and e4 is the one with the smallest. The optimization loops from e1 to e4 in decreasing $\bar{\iota}(e)$ values. The number below each $E_e'(i(e))$ is its computed value (e.g. $E_e'(i(e_1)=1)=|\varepsilon(s_1)-\bar{\varepsilon}(s_1)|+|\varepsilon(s_2)-\varepsilon(s_2)|=|1-1|+|1-1|+|1-1.9|=0.9$). The light edges are not optimized with initial values $i(e)=0$. The dark edges are optimized with $i(e)=1$. The dark dashed edge is optimized with $i(e)=0$. The light dashed edge indicates there is no edge after optimization.

Figure 6:
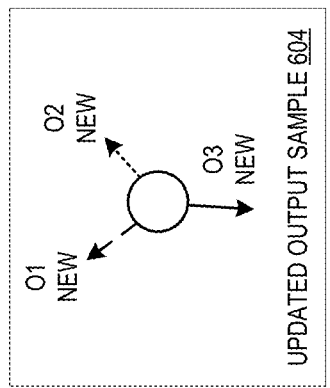
FIG. 6 illustrates examples of orientation assignment in accordance with one or more embodiments.
Figure 6:
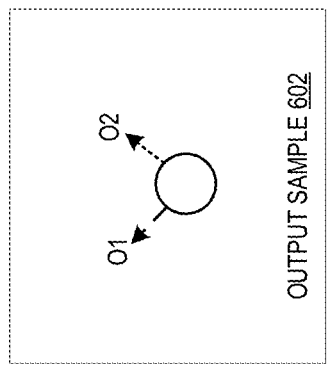
Figure 6:
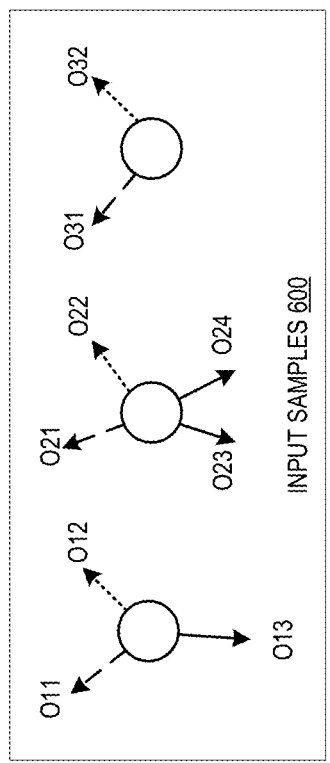

FIG. 6 illustrates examples of orientation assignment in accordance with one or more embodiments. The example of FIG. 6 illustrates the orientation assignment step when $N_o(s_o)$ is increased from 2 to 3. The output sample 602 is matched with the three input samples 600. Matched orientations o (arrows) are visualized in the same types of lines (e.g., solid lines match solid lines, dashed lines match dashed lines, and dotted lines match dotted lines). In this example, the unmatched inputs o are solid lines. Updated output sample 604 shows the updated orientations of the output sample. The dashed $o_1^{new}$ and dotted $o_2^{new}$ are updated by averaging matched input orientations of $o_{11}$, $o_{21}$, and $o_{31}$ and $o_{12}$, $o_{22}$, and $o_{32}$, respectively. The solid output orientation $o_3^{new}$ is newly added by choosing the median from the three unmatched orientations ($o_{13}$, $o_{23}$, and $o_{24}$) from the input samples 600.

Figure 7:
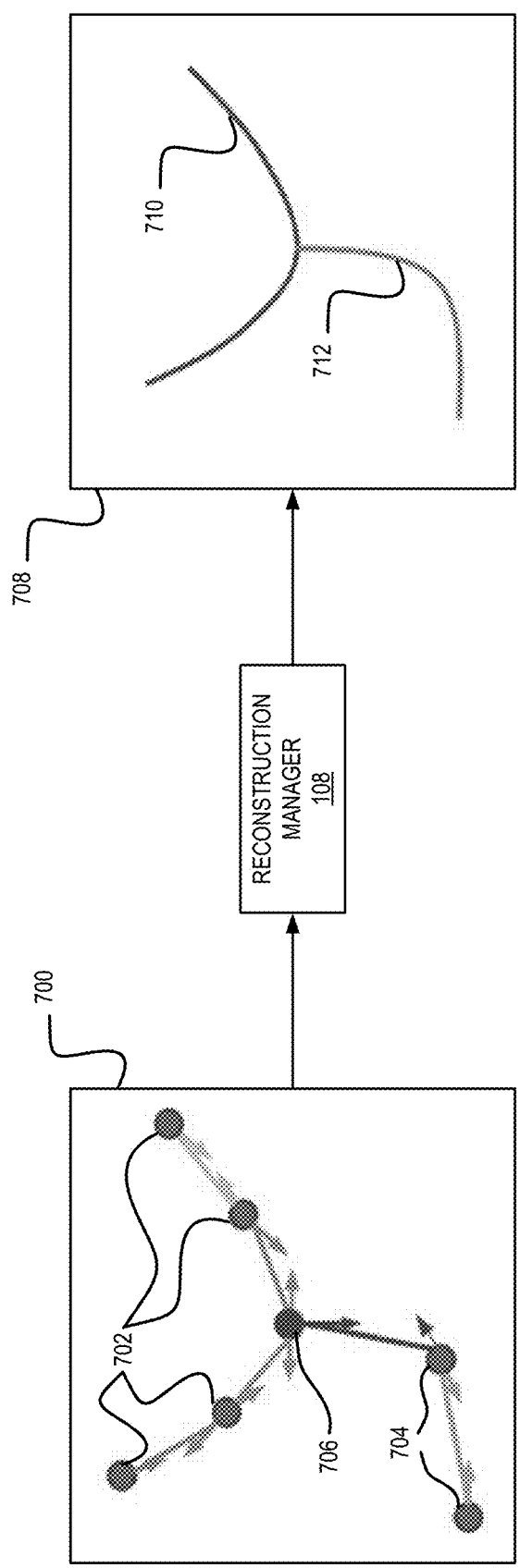
FIG. 7 illustrates an example of curve reconstruction in accordance with one or more embodiments.

FIG. 7 illustrates an example of curve reconstruction in accordance with one or more embodiments. As discussed above, curve reconstruction is performed based on the information associated with each sample, which was determined during the optimization of the output graph. In particular, the orientations of the samples may be used during reconstruction to identify curves. In some embodiments, a heuristic based on the tangents associated with each sample may be used to identify curves. For example, each sample is associated with one or more orientation vectors, depending on the numbers of edges associated with that sample. When the tangents are colinear, then that sample is classified as being on a single segment. When a sample is associated with tangents that are not colinear, then that sample is classified as being a boundary between curves.

For example, as shown in FIG. 7, an optimized output graph 700 is provided to reconstruction manager 108.

Reconstruction manager can use the orientation information associated with each sample to identify which samples belong to a curve, and which samples (if any) exist at a boundary between curves (e.g., an intersection). As shown, samples 702 and 704 are each associated with one or two tangents, corresponding to the number of edges associated with the samples. These tangents are identified from the orientation information stored with each sample. In this example, the tangents associated with each sample are colinear (within a threshold margin of error). Sample 706, however, is associated with three tangents and they are not colinear. As such, sample 706 is determined to be at a boundary between curves. Samples 702 and 706 form a curve from one endpoint to another (e.g., the sample points with only one tangent), and samples 704 and 706 form a second curve, starting from an endpoint and ending at a boundary sample. Based on this heuristic, reconstruction manager 108 reconstructs output curves 708, which includes curves 710 and 712.

Figure 8:
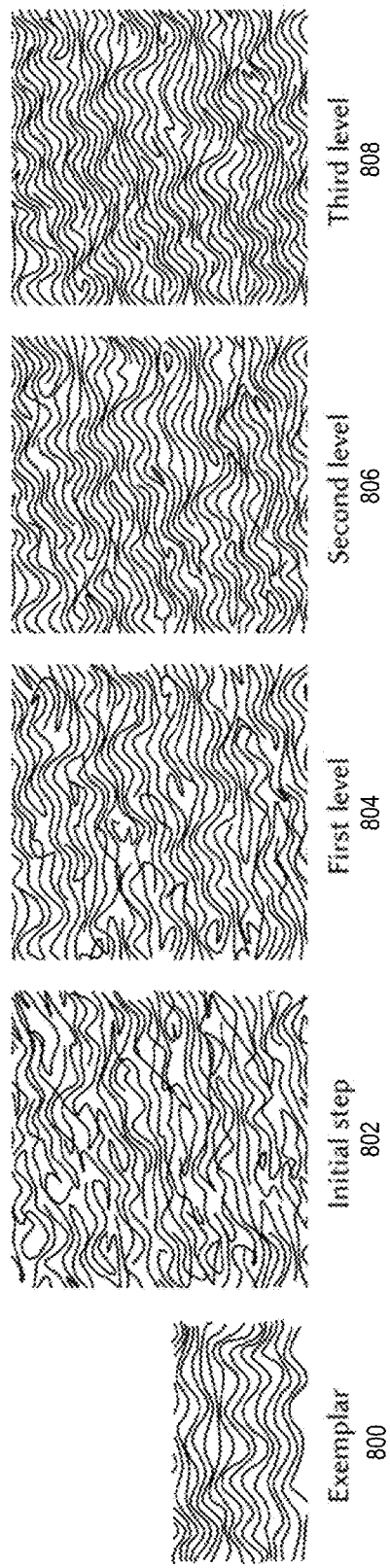
FIG. 8 illustrates an example of hierarchical curve synthesis in accordance with one or more embodiments.

FIG. 8 illustrates an example of hierarchical curve synthesis in accordance with one or more embodiments. Using the exemplar 800, hierarchical synthesis proceeds from coarser to finer levels, with upsampling sample representations. For example, the initial step 802 uses the sparsest representation of the exemplar 800 to reconstruct initial step 802. The exemplar 800 can then be sampled more robustly (e.g., by reducing the δ value discussed above) iteratively, to generate first level 804, second level 806, and third level 808. The hierarchical synthesis gradually refines the pattern from large to small scale structures.

Figure 9:
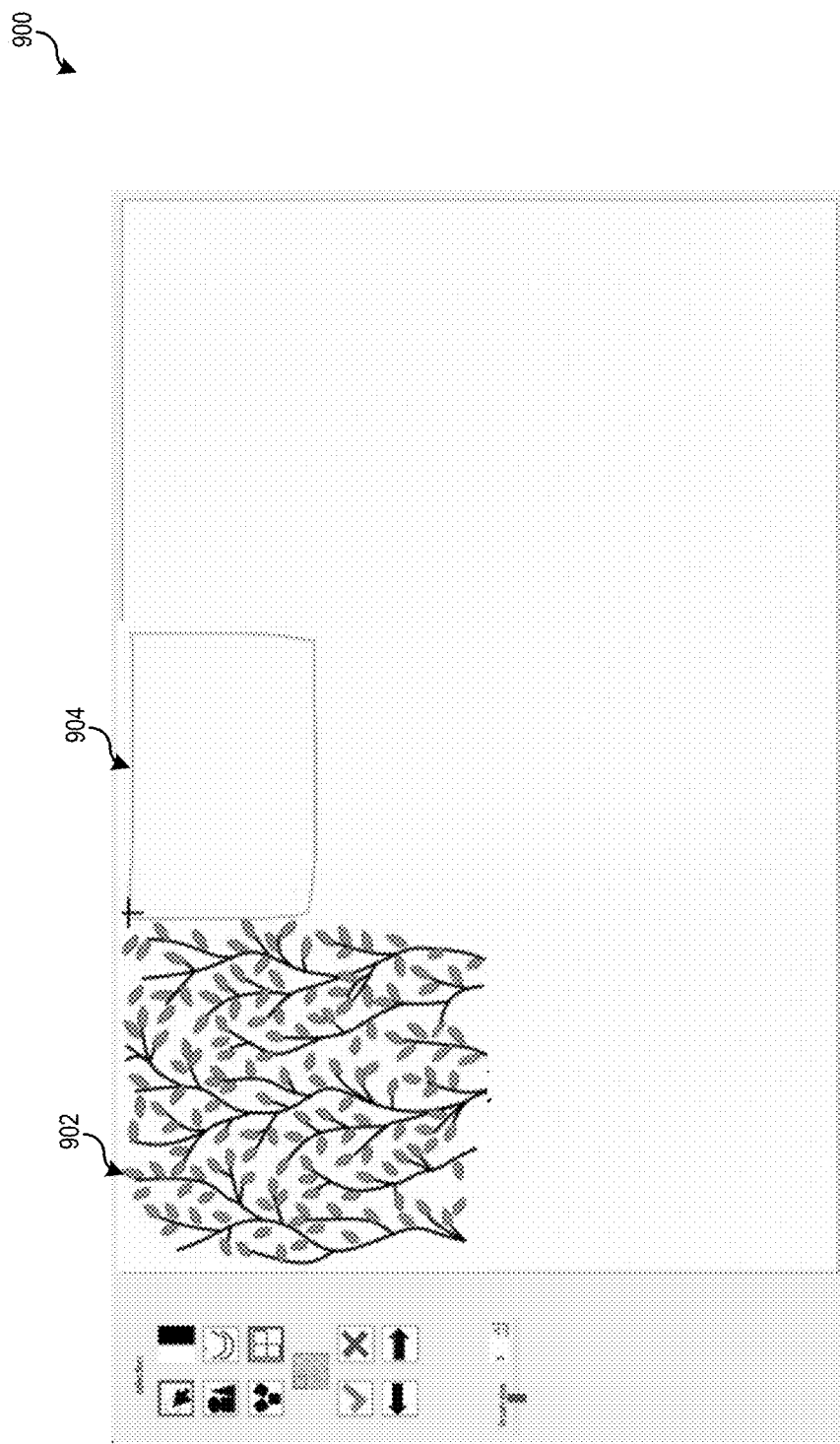
FIGS. 9-10 illustrate an example user interface for generating continuous curve textures in accordance with one or more embodiments.
Figure 10:
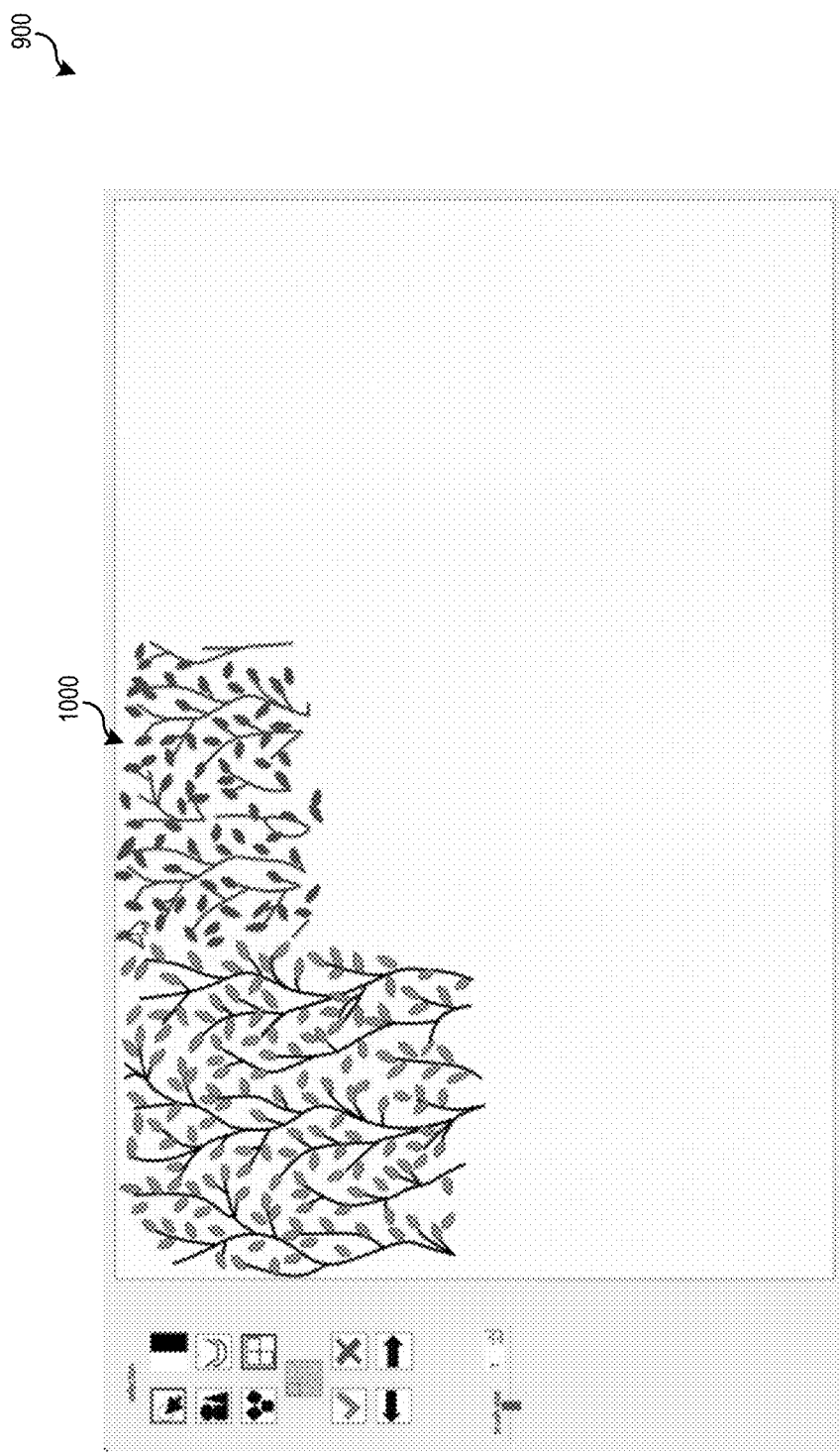

FIGS. 9-10 illustrate an example user interface 900 for generating continuous curve textures in accordance with one or more embodiments. Embodiments may include a user interface 900 through which a user may create an exemplar 902 to be used to generate a continuous curve texture, as discussed herein. For example, the techniques described herein can be used for both automatic synthesis and interactive editing. As discussed, the user provides an exemplar pattern 902 and the system then automatically produces an output with a desired size and shape. For example, as shown at 904, the user may select (e.g., draw or otherwise create) a freeform region which is to be filled with a continuous curve texture synthesized based on the provided exemplar 902.

In some embodiments, the exemplar is represented via Bézier curves. Inputs in other formats can be converted to Bézier curves (for example, by vectorizing a raster image). Since the automatic synthesis results might not be what the users want and they might need to create new patterns manually, embodiments also provide an interface built upon the automatic synthesis techniques described herein for users to author patterns interactively. Through the interface, users can specify an output region 904 in their desired size and shape and let the system predict patterns that resemble what the users have already drawn. In some embodiments, the users can also explicitly control the prediction by copying-pasting from an input region to an output region. They can accept, partially accept, or reject the predictions via keyboard shortcuts and mouse selections.

For example, FIG. 9 represents the interface before an autocomplete operation has been performed and FIG. 10 represents the interface after the autocomplete operation has been performed. In the autocomplete mode, the user can specify an output region 904 and let the system generate predicted patterns as shown at 1000. Other modes may also be implemented, such as clone mode, where the user can specify a source region and clone it to a target region. In some embodiments, the system can generate predictions adaptive to the existing patterns, upon which users can perform further refinements. For example, a portion of the predictions can be edited (e.g., partially rejecting several paths, copy-pasting elements, adding a path, etc.). The user can also perform further edits, such as selecting regions for re-synthesis or adding paths in the predictions.

In some embodiments, additional controllability may also be provided to the user. For example, the user interface may allow the user to control an orientation of the overall pattern. So, in addition to selecting a region in which to autocomplete the output texture, the user may also identify the direction(s) in which the text may flow. For example, the textures may follow a control curve that specifies the direction(s) of the pattern, causing the orientation of the pattern to change spatially within the output region.

Figure 11:
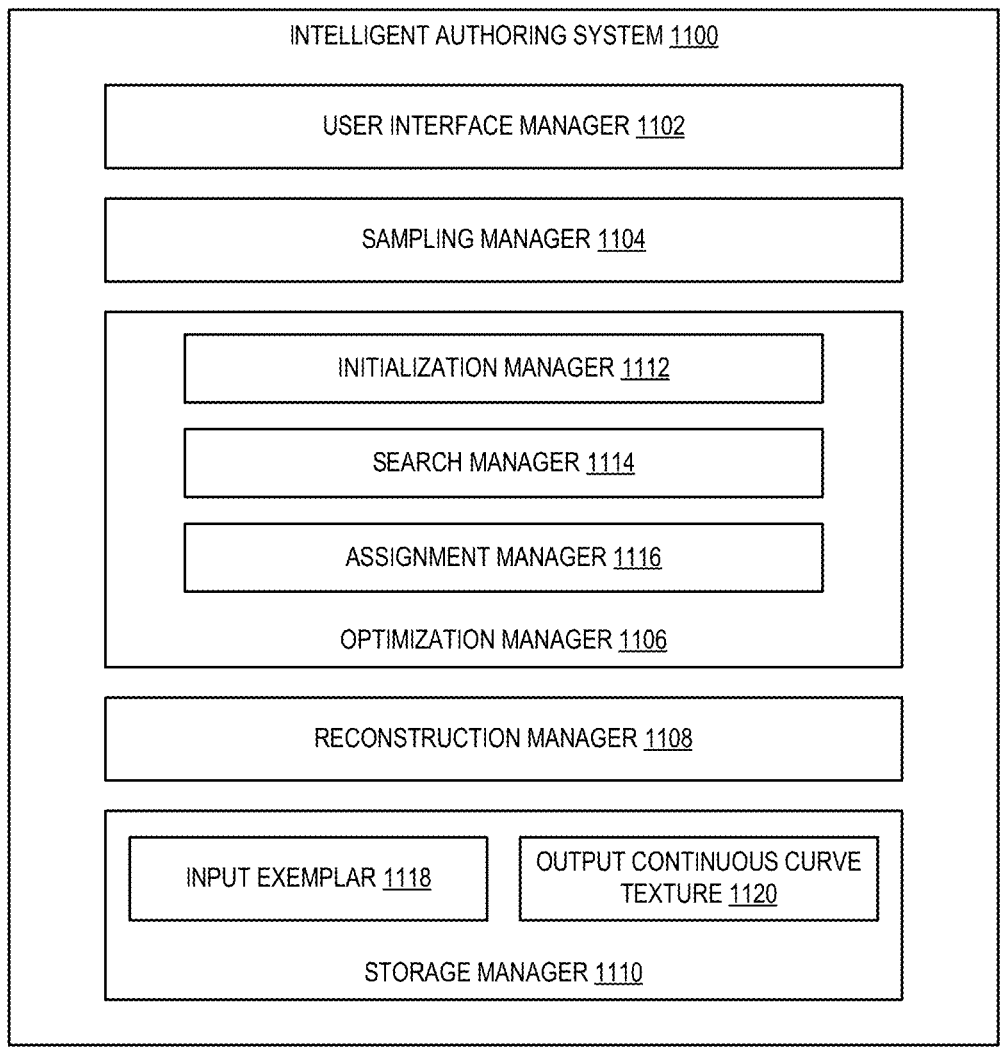
FIG. 11 illustrates a schematic diagram of an intelligent authoring system in accordance with one or more embodiments.

FIG. 11 illustrates a schematic diagram of intelligent authoring system (e.g., "intelligent authoring system" described above) in accordance with one or more embodiments. As shown, the intelligent authoring system 1100 may include, but is not limited to, user interface manager 1102, sampling manager 1104, optimization manager 1106, reconstruction manager 1108, and storage manager 1110. The optimization manager 1106 includes an initialization manager 1112, a search manager 1114, and an assignment manager 1116. The storage manager 1110 includes input exemplar 1118 and output continuous curve texture 1120.

As illustrated in FIG. 11, the intelligent authoring system 1100 includes a user interface manager 1102. For example, the user interface manager 1102 allows users to create an exemplar from which the intelligent authoring system can generate continuous curve textures. In some embodiments, the user interface manager 1102 provides a user interface through which the user can draw or otherwise design the exemplar. For example, the user interface may enable the user to define a plurality of Bezier curves. In some embodiments, the user interface manager 1102 enables a user to select one or more files (e.g., image files, video frames, vector graphics, etc.) which include an input exemplar 1118 and are stored or accessible by storage manager 1110. In some embodiments, the user interface manager 1102 enables the user to select a specific portion of an input to be used as an input exemplar. Additionally, the user interface manager 1002 allows users to request the intelligent authoring system to generate a continuous curve texture based on the input exemplar (e.g., output continuous curve texture 1120). Further, the user interface manager 1102 allows users to edit the generated continuous curve texture, as discussed above.

As further illustrated in FIG. 11, the intelligent authoring system 1100 may further include a sampling manager 1104. The sampling manager 1104 can sample the input exemplar to identify a plurality of sample points and edges that connect the sample points. In some embodiments, the sampling manager 1104 can sample endpoints of curves, intersections of curves, and additional points along curves based on a sampling distance δ, as discussed above. In some embodiments, hierarchical synthesis may lead to the sampling manager 1104 performing multiple samplings of the input exemplar at different resolutions, from a coarse sample to a fine sample, wherein the sampling distance is reduced with each iteration. Once sampled, a graph representation of the input exemplar which stores a plurality of attributes associated with each sample point can be provided to the optimization manager to generate and optimize an output graph that is similar to the input graph representation.

As further illustrated in FIG. 11, the intelligent authoring system 1100 may further include an optimization manager 1106. The optimization manager 1106 is responsible for initializing the output graph and then optimizing the output graph such that each local neighborhood (e.g., patch)_ of the output graph is similar to a local neighborhood of the input graph. Each local neighborhood may be a subgraph of the input or output graph. As discussed, this may be performed using a similarity metric to match neighborhoods. One example of such neighborhood matching is robust neighborhood matching, discussed above. The initialization manager 1112 can randomly initialize the output graph or perform a patch-based initialization, as discussed above. The search manager 1114 can compute approximate nearest neighbors (ANN) for each output sample in the graph. For example, the search manager may implement a PatchMatch algorithm to generate the initial nearest neighbor field and alternate between propagation and search through the image grid in a scanline order. Once the output graph has been updated by the search manager 1114, the assignment manager 1116 can then determine attributes for each node in the output graph. As discussed above, this may include position assignment to determine the position of each node. Additionally, existence assignment and edge assignment can be performed to determine the likelihood of an edge or node existing in the output graph. This enables nodes and edges to be removed or added depending on their likelihood of existence, making for a more accurate output graph. Orientation assignment may also be performed to determine orientation values associated with each node in the output graph. This can include both identifying the number of orientation entries and their values, as well as updating the orientation values to new values, along with adding or removing orientation values that are unlikely to exist or which are likely to be missing. In some embodiments, all patches of the output graph are optimized simultaneously. Additionally, the optimization process may be performed iteratively until all patches have been optimized.

As further illustrated in FIG. 11, the intelligent authoring system 1100 may further include a reconstruction manager 1108. Once the output graph has been optimized, it can be provided to reconstruction manager 1108. Reconstruction manager 1108 can then generate curves from the output graph. For example, the reconstruction manager 1108 can apply heuristics to the orientation information associated with each node of the output graph to identify different curves. If the tangents associated with a node are colinear, then it is considered to be on a curve. Each node, starting with an endpoint, can be evaluated until a node with tangents that are not colinear is found. This node likely represents an intersection with another curve, based on the heuristic that the edges associated with a node are roughly colinear when that node is part of a curve. This can be applied throughout the output graph to reconstruct the output graph into a plurality of curves (such as Bezier curves, or other vector graphic elements). Once complete, the output continuous curve texture can then be stored using the storage manager 1110.

As illustrated in FIG. 11, the intelligent authoring system 1100 also includes the storage manager 1110. The storage manager 1110 maintains data for the intelligent authoring system 1100. The storage manager 1110 can maintain data of any type, size, or kind as necessary to perform the functions of the intelligent authoring system 1100. The storage manager 1110, as shown in FIG. 11, includes the input exemplar 1118. The input exemplar 1118 can include a plurality of curves drawn by the user via the user interface manager 1102 or another application or interface, as discussed in additional detail above. In some embodiments, the input exemplar can include a raster image of a pattern that can then be vectorized to obtain the input exemplar for use by the intelligent authoring system. In some embodiments, the input exemplar can include a vector graphics file that includes a plurality of curves. All or some of the input exemplar may be selected by the user for use by the intelligent authoring system to generate the continuous curve texture using the techniques described above. The storage manager 1110 also includes the output continuous curve texture 1120 generated based on the input exemplar 1118. The output continuous curve texture can include a plurality of vector curves (e.g., Bezier curves or other vector elements). The output continuous curve text can be shown via user interface manager in a region selected by the user, and may be further edited by the user after generation.

Each of the components 1102-1110 of the intelligent authoring system 1100 and their corresponding elements (as shown in FIG. 11) may be in communication with one another using any suitable communication technologies. It will be recognized that although components 1102-1110 and their corresponding elements are shown to be separate in FIG. 11, any of components 1102-1110 and their corresponding elements may be combined into fewer components, such as into a single facility or module, divided into more components, or configured into different components as may serve a particular embodiment.

The components 1102-1110 and their corresponding elements can comprise software, hardware, or both. For example, the components 1102-1110 and their corresponding elements can comprise one or more instructions stored on a computer-readable storage medium and executable by processors of one or more computing devices. When executed by the one or more processors, the computer-executable instructions of the intelligent authoring system 1100 can cause a client device and/or a server device to perform the methods described herein. Alternatively, the components 1102-1110 and their corresponding elements can comprise hardware, such as a special purpose processing device to perform a certain function or group of functions. Additionally, the components 1102-1110 and their corresponding elements can comprise a combination of computer-executable instructions and hardware.

Furthermore, the components 1102-1110 of the intelligent authoring system 1100 may, for example, be implemented as one or more stand-alone applications, as one or more modules of an application, as one or more plug-ins, as one or more library functions or functions that may be called by other applications, and/or as a cloud-computing model. Thus, the components 1102-1110 of the intelligent authoring system 1100 may be implemented as a stand-alone application, such as a desktop or mobile application. Furthermore, the components 1102-1110 of the intelligent authoring system 1100 may be implemented as one or more web-based applications hosted on a remote server. Alternatively, or additionally, the components of the intelligent authoring system 1100 may be implemented in a suit of mobile device applications or "apps." To illustrate, the components of the intelligent authoring system 1100 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 12:
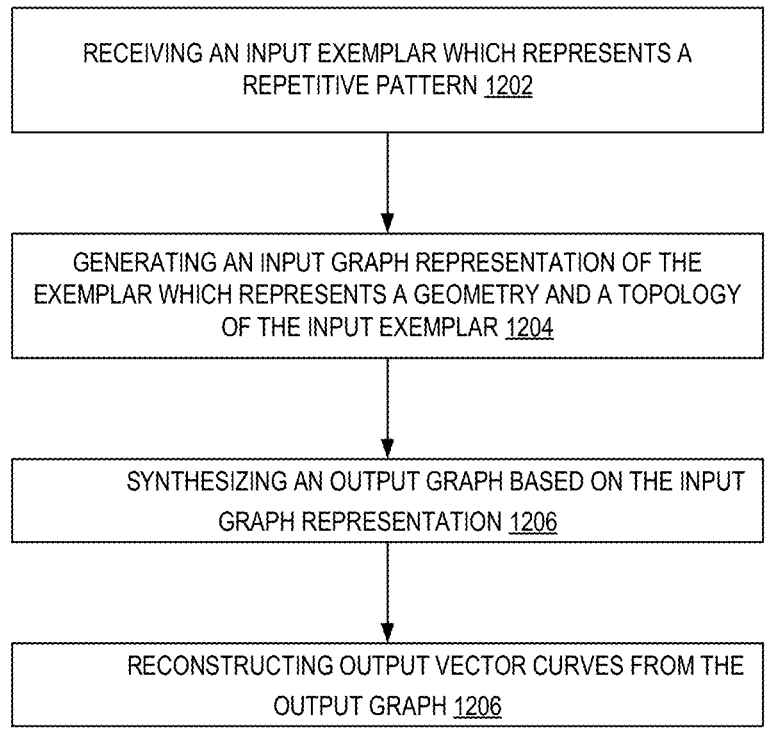
FIG. 12 illustrates a flowchart of a series of acts in a method of generating continuous curve textures in accordance with one or more embodiments.

FIGS. 1-11, the corresponding text, and the examples, provide a number of different systems and devices that allows for generation of continuous curve textures based on an input exemplar. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of generating continuous curve textures in accordance with one or more embodiments. In one or more embodiments, the method 1200 is performed in a digital medium environment that includes the intelligent authoring system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of receiving, by a user interface manager, an input exemplar which represents a repetitive pattern as a plurality of vector curves. As discussed, the intelligent authoring system may provide a user interface through which the user may design the input exemplar. For example, the user may draw the input exemplar via the user interface (e.g., defining a number of vector graphic curves or other elements. In some embodiments, the user may define the input exemplar in a different graphics application and provide a file which includes the input exemplar. In such instances, the input exemplar may be a vector graphics file or an image file. If an image file, in some embodiments, the image may be vectorized before being used as the input exemplar. For example, in some embodiments, receiving an input exemplar which represents a repetitive pattern as a plurality of vector curves, may further include providing a user interface including a canvas and one or more drawing tools, wherein the user interface receives one or more inputs defining the input exemplar including the plurality of vector curves and metadata defining relationships between the plurality of vector curves.

As illustrated in FIG. 12, the method 1200 includes an act 1204 generating an input graph representation of the input exemplar which represents a geometry and a topology of the input exemplar. In some embodiments, generating the graph representation of the exemplar may include sampling a plurality of points on the plurality of curves, determining one or more edges associated with each of the plurality of points, and determining local orientations of each of the plurality of points based on their associated one or more edges.

As illustrated in FIG. 12, the method 1200 includes an act 1206 synthesizing an output graph based on the input graph representation. In some embodiments, synthesizing an output graph based on the input graph representation, may further include initializing a plurality of overlapping patches of the output graph with a plurality of output points, matching each patch of the output graph to a sub-graph of the input graph representation based on robust neighborhood matching, and iteratively optimizing the plurality of overlapping patches of the output graph based on the matched sub-graph of the input graph representation until each patch is similar to at least one sub-graph of the input graph representation. In various embodiments, the output graph may be larger or smaller than the input graph representation. Likewise, the output graph may be of a different shape than the input graph representation.

In some embodiments, iteratively optimizing a plurality of overlapping patches of the output graph based on the matched sub-graph of the input graph representation until each patch is similar to at least one sub-graph of the input graph representation may further include generating candidate samples to add to each patch of the output graph, determining a confidence of existence associated with one or more of the candidate samples is greater than a threshold value, and adding the one or more candidate samples to each patch of the output graph based on the confidence of existence.

In some embodiments, iteratively optimizing a plurality of overlapping patches of the output graph based on the matched sub-graph of the input graph representation until each patch is similar to at least one sub-graph of the input graph representation, further includes identifying one or more unmatched output points in one or more of the overlapping patches of the output graph, determining a confidence of existence associated with the one or more unmatched output points is less than a threshold value, and removing the one or more unmatched output points from the one or more of the plurality of overlapping patches of the output graph based on the confidence of existence.

As illustrated in FIG. 12, the method 1200 includes an act 1208 reconstructing output vector curves from the output graph. In some embodiments, reconstructing output vector curves from the output graph, may further include determining a plurality of path objects of an output vector graphic based on an orientation attribute associated with each output point in the output graph, and generating an output vector graphic including the plurality of path objects.

Figure 13:
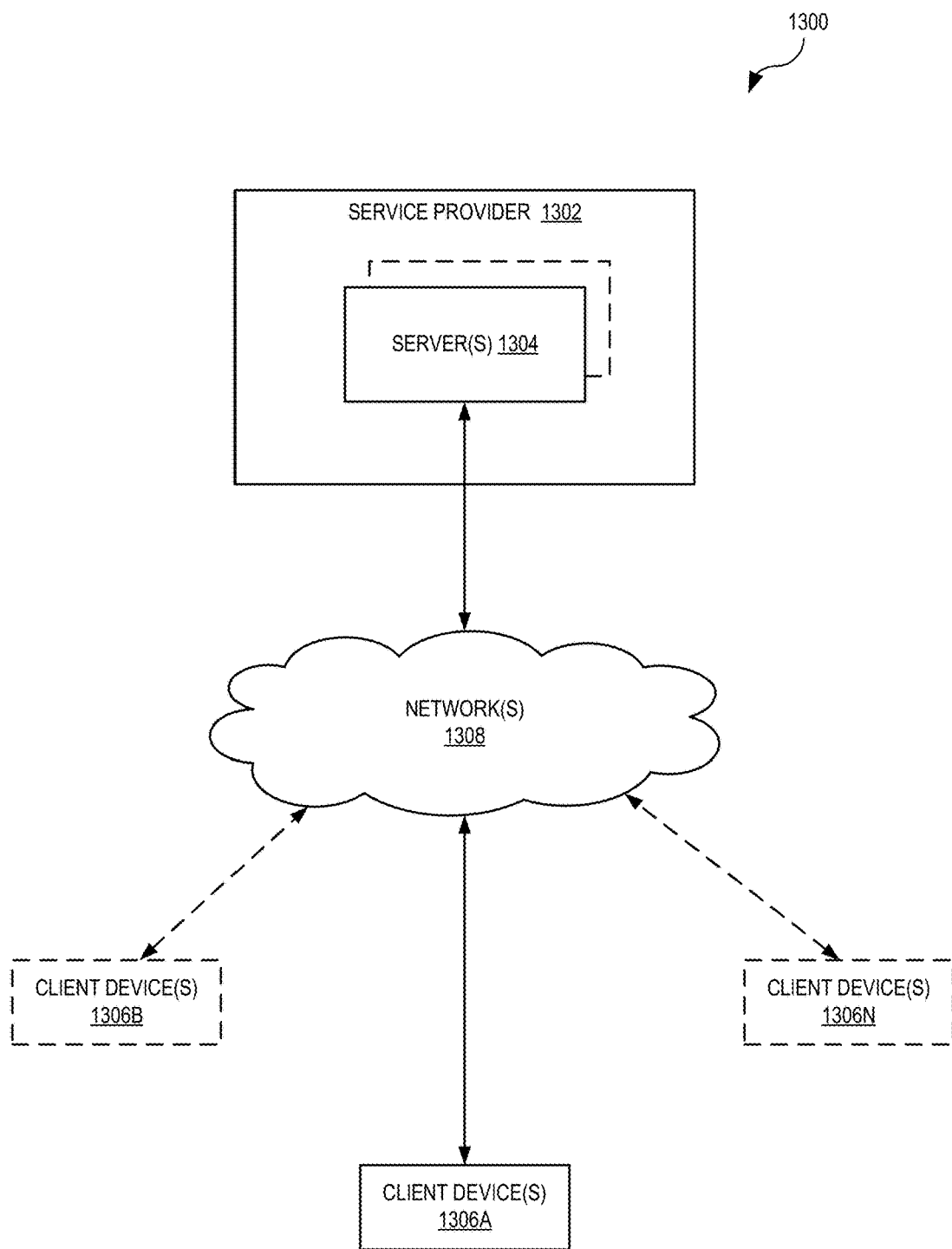
FIG. 13 illustrates a schematic diagram of an exemplary environment in which the image processing system can operate in accordance with one or more embodiments.

FIG. 13 illustrates a schematic diagram of an exemplary environment 1300 in which the intelligent authoring system 1100 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the intelligent authoring system 1100. In particular, the intelligent authoring system 1100 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including input exemplar data 1118, output continuous curve texture data 1120, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the intelligent authoring system 1100. In particular, the intelligent authoring system 1100 can comprise an application running on the one or more servers 1304 or a portion of the intelligent authoring system 1100 can be downloaded from the one or more servers 1304. For example, the intelligent authoring system 1100 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 can provide access to a user interface through which the user may draw or otherwise provide an input exemplar. Moreover, the client device 1306A can receive a request (i.e., via user input) to generate a continuous curve texture based on the input exemplar and provide the request to the one or more servers 1304. Upon receiving the request, the one or more servers 1304 can automatically perform the methods and processes described above to generate the continuous curve texture. The one or more servers 1304 can provide all or portions of continuous curve texture, to the client device 1306A for display to the user.

As just described, the intelligent authoring system 1100 may be implemented in whole, or in part, by the individual elements 1302-1308 of the environment 1300. It will be appreciated that although certain components of the intelligent authoring system 1100 are described in the previous examples with regard to particular elements of the environment 1300, various alternative implementations are possible. For instance, in one or more embodiments, the intelligent authoring system 1100 is implemented on any of the client devices 1306A-N. Similarly, in one or more embodiments, the intelligent authoring system 1100 may be implemented on the one or more servers 1304. Moreover, different components and functions of the intelligent authoring system 1100 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
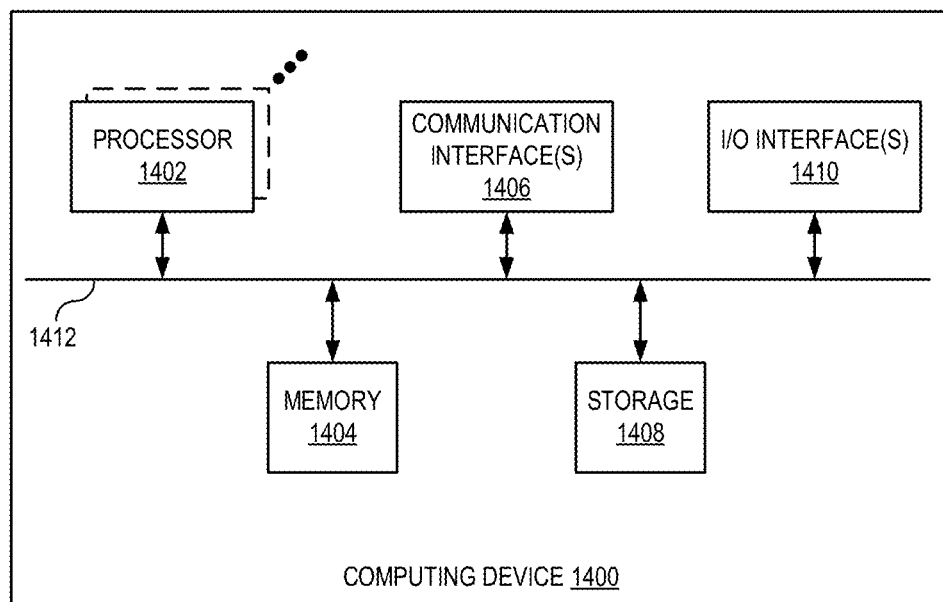
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the image processing system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving an input exemplar which represents a repetitive pattern as a plurality of vector curves;
    generating an input graph representation of the input exemplar which represents a geometry and a topology of the input exemplar, wherein the topology indicates a connection between each point of a plurality of points on the plurality of vector curves using one or more tangents associated with each point, wherein the each point is associated with a number of tangents corresponding to a number of edges;
    classifying the each point as being on a segment or being on an intersection based on a collinearity between the each point and the one or more tangents associated with the each point;
    synthesizing an output graph based on the input graph representation and a cost, wherein synthesizing the output graph includes initializing a plurality of output points and identifying a match between the plurality of points on the plurality of vector curves and the plurality of output points and identifying an outlier between the plurality of points on the plurality of vector curves and the plurality of output points, wherein the outlier is assigned the cost; and
    reconstructing output vector curves from the output graph and the classification of the each point.

2. The computer-implemented method of claim 1, wherein generating an input graph representation of the input exemplar which represents a geometry and a topology of the input exemplar, further comprises:
    sampling the plurality of points on the plurality of vector curves;
    determining one or more edges associated with each of the plurality of points; and
    determining local orientations of each of the plurality of points based on their associated one or more edges.

3. The computer-implemented method of claim 1, wherein synthesizing an output graph based on the input graph representation, further comprises:
    initializing a plurality of overlapping patches of the output graph, each patch with the plurality of output points;
    matching each patch of the output graph to a sub-graph of the input graph representation based on robust neighborhood matching; and
    iteratively optimizing the plurality of overlapping patches of the output graph based on the matched sub-graph of the input graph representation until each patch is similar to at least one sub-graph of the input graph representation.

4. The computer-implemented method of claim 3, wherein iteratively optimizing the plurality of overlapping patches of the output graph based on the matched sub-graph of the input graph representation until each patch is similar to at least one region of the input graph representation further comprises:
    generating candidate samples to add to each patch of the output graph;
    determining a confidence of existence associated with one or more of the candidate samples is greater than a threshold value; and
    adding one or more of the candidate samples to each patch of the output graph based on the confidence of existence.

5. The computer-implemented method of claim 3, wherein iteratively optimizing the plurality of overlapping patches of the output graph based on the matched sub-graph of the input graph representation until each patch is similar to at least one region of the input graph representation, further comprises:
identifying one or more unmatched output points in one or more of the plurality of overlapping patches of the output graph;
determining a confidence of existence associated with the one or more unmatched output points is less than a threshold value; and
removing the one or more unmatched output points from the one or more of the plurality of overlapping patches of the output graph based on the confidence of existence.

6. The computer-implemented method of claim 1, wherein reconstructing output vector curves from the output graph, further comprises:
determining a plurality of path objects of an output vector graphic based on an orientation attribute associated with each output point in the output graph; and
generating an output vector graphic including the plurality of path objects.

7. The computer-implemented method of claim 1, wherein receiving an input exemplar which represents a repetitive pattern as a plurality of vector curves, further comprises:
providing a user interface including a canvas and one or more drawing tools, wherein the user interface receives one or more inputs defining the input exemplar including the plurality of vector curves and metadata defining relationships between the plurality of vector curves.

8. A non-transitory computer-readable storage medium including instructions stored thereon which, when executed by at least one processor, cause the at least one processor to:
receive an input exemplar which represents a repetitive pattern as a plurality of vector curves;
generate an input graph representation of the input exemplar which represents a geometry and a topology of the input exemplar, wherein the topology indicates a connection between each point of a plurality of points on the plurality of vector curves using one or more tangents associated with each point, wherein the each point is associated with a number of tangents corresponding to a number of edges;
classify the each point as being on a segment or being on an intersection based on a collinearity between the each point and the one or more tangents associated with the each point;
synthesize an output graph based on the input graph representation and a cost, wherein synthesizing the output graph includes initializing a plurality of output points and identifying a match between the plurality of points on the plurality of vector curves and the plurality of output points and identifying an outlier between the plurality of points on the plurality of vector curves and the plurality of output points, wherein the outlier is assigned the cost; and
reconstruct output vector curves from the output graph and the classification of the each point.

9. The non-transitory computer-readable storage medium of claim 8, wherein to generate an input graph representation of the input exemplar which represents a geometry and a topology of the input exemplar, the instructions, when executed, further cause the at least one processor to:
sample the plurality of points on the plurality of vector curves;
determine one or more edges associated with each of the plurality of points; and
determine local orientations of each of the plurality of points based on their associated one or more edges.

10. The non-transitory computer-readable storage medium of claim 8, wherein to synthesize an output graph based on the input graph representation, the instructions, when executed, further cause the at least one processor to:
initialize a plurality of overlapping patches of the output graph with the plurality of output points;
match each patch of the output graph to a sub-graph of the input graph representation based on robust neighborhood matching; and
iteratively optimize the plurality of overlapping patches of the output graph based on the matched sub-graph of the input graph representation until each patch is similar to at least one sub-graph of the input graph representation.

11. The non-transitory computer-readable storage medium of claim 10, wherein to iteratively optimize the plurality of overlapping patches of the output graph based on the matched sub-graph of the input graph representation until each patch is similar to at least one sub-graph of the input graph representation, the instructions, when executed, further cause the at least one processor to:
generate candidate samples to add to each patch of the output graph;
determine a confidence of existence associated with one or more of the candidate samples is greater than a threshold value; and
add one or more of the candidate samples to each patch of the output graph based on the confidence of existence.

12. The non-transitory computer-readable storage medium of claim 10, wherein to iteratively optimize the plurality of overlapping patches of the output graph based on the matched sub-graph of the input graph representation until each patch is similar to at least one sub-graph of the input graph representation, the instructions, when executed, further cause the at least one processor to:
identify one or more unmatched output points in the one or more of the plurality of overlapping patches of the output graph;
determine a confidence of existence associated with the one or more unmatched output points is less than a threshold value; and
remove the one or more unmatched output points from the one or more of the plurality of overlapping patches of the output graph based on the confidence of existence.

13. The non-transitory computer-readable storage medium of claim 8, wherein to reconstruct output vector curves from the output graph, the instructions, when executed, further cause the at least one processor to:
determine a plurality of path objects of an output vector graphic based on an orientation attribute associated with each output point in the output graph; and
generate an output vector graphic including the plurality of path objects.

14. The non-transitory computer-readable storage medium of claim 8, wherein to receive an input exemplar which represents a repetitive pattern as a plurality of vector curves, the instructions, when executed, further cause the at least one processor to:
provide a user interface including a canvas and one or more drawing tools, wherein the user interface receives one or more inputs defining the input exemplar including the plurality of vector curves and metadata defining relationships between the plurality of vector curves.

15. A system, comprising:
a processor; and
a memory including instructions stored thereon which, when executed, cause the system to:
receive an input exemplar which represents a repetitive pattern as a plurality of vector curves;
generate an input graph representation of the input exemplar which represents a geometry and a topology of the input exemplar, wherein the topology indicates a connection between each point of a plurality of points on the plurality of vector curves using one or more tangents associated with each point, wherein the each point is associated with a number of tangents corresponding to a number of edges;
classify the each point as being on a segment or being on an intersection based on a collinearity between the each point and the one or more tangents associated with the each point;
synthesize an output graph based on the input graph representation and a cost, wherein synthesizing the output graph includes initializing a plurality of output points and identifying a match between the plurality of points on the plurality of vector curves and the plurality of output points and identifying an outlier between the plurality of points on the plurality of vector curves and the plurality of output points, wherein the outlier is assigned the cost; and
reconstruct output vector curves from the output graph and the classification of the each point.

16. The system of claim 15, wherein to generate an input graph representation of the input exemplar which represents a geometry and a topology of the input exemplar, further cause the system to:
sample the plurality of points on the plurality of vector curves;
determine one or more edges associated with each of the plurality of points; and
determine local orientations of each of the plurality of points based on their associated one or more edges.

17. The system of claim 15, wherein to synthesize an output graph based on the input graph representation, the instructions, when executed, further cause the system to:
initialize a plurality of overlapping patches of the output graph with the plurality of output points;
match each patch of the output graph to a sub-graph of the input graph representation based on robust neighborhood matching; and
iteratively optimize the plurality of overlapping patches of the output graph based on the matched sub-graph of the input graph representation until each patch is similar to at least one sub-graph of the input graph representation.

18. The system of claim 17, wherein to iteratively optimize the plurality of overlapping patches of the output graph based on the matched sub-graph of the input graph representation until each patch is similar to at least one sub-graph of the input graph representation, the instructions, when executed, further cause the system to:
generate candidate samples to add to each patch of the output graph;
determine a confidence of existence associated with one or more of the candidate samples is greater than a threshold value; and
add one or more of the candidate samples to each patch of the output graph based on the confidence of existence.

19. The system of claim 17, wherein to iteratively optimize the plurality of overlapping patches of the output graph based on the matched sub-graph of the input graph representation until each patch is similar to at least one sub-graph of the input graph representation, the instructions, when executed, further cause the system to:
identify one or more unmatched output points in one or more of the plurality of overlapping patches of the output graph;
determine a confidence of existence associated with the one or more unmatched output points is less than a threshold value; and
remove the one or more unmatched output points from the one or more of the plurality of overlapping patches of the output graph based on the confidence of existence.

20. The system of claim 15, wherein to reconstruct output vector curves from the output graph, the instructions, when executed, further cause system to:
determine a plurality of path objects of an output vector graphic based on an orientation attribute associated with each output point in the output graph; and
generate an output vector graphic including the plurality of path objects.

* * * * *